(12) United States Patent
Suzuki

(10) Patent No.: US 8,867,093 B2
(45) Date of Patent: Oct. 21, 2014

(54) PRINTING SYSTEM AND BUSINESS PARTNER SELECTION METHOD THAT SELECTS AN OPTIMUM BUSINESS PARTNER CAPABLE OF DELIVERING HIGH-QUALITY PRINTED MATERIALS

(75) Inventor: Fumio Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 13/482,387

(22) Filed: May 29, 2012

(65) Prior Publication Data

US 2012/0307272 A1     Dec. 6, 2012

(30) Foreign Application Priority Data

Jun. 6, 2011 (JP) ................................ 2011-126129

(51) Int. Cl.
*G06F 15/00* (2006.01)
*G06F 3/12* (2006.01)
*G06Q 30/02* (2012.01)
*G06Q 10/00* (2012.01)

(52) U.S. Cl.
CPC .............. *G06Q 30/02* (2013.01); *G06F 3/1288* (2013.01); *G06F 3/1272* (2013.01); *G06F 3/1203* (2013.01); *G06F 3/126* (2013.01); *G06F 3/1287* (2013.01)
USPC ............................ 358/1.9; 358/1.15; 705/7.29

(58) Field of Classification Search
None
See application file for complete search history.

(56) References Cited

U.S. PATENT DOCUMENTS

| 2002/0032578 | A1* | 3/2002 | Fukuda et al. ..................... 705/1 |
| 2002/0072994 | A1 | 6/2002 | Mori et al. |
| 2005/0171791 | A1* | 8/2005 | Chimenti et al. ................. 705/1 |
| 2005/0243365 | A1 | 11/2005 | Noda |
| 2009/0006176 | A1* | 1/2009 | Handley .......................... 705/10 |
| 2012/0177291 | A1* | 7/2012 | Gronau et al. ................ 382/190 |

FOREIGN PATENT DOCUMENTS

| JP | 2002-175453 | 6/2002 |
| JP | 2005-339515 | 12/2005 |
| JP | 2007-004348 | 1/2007 |
| JP | 2008-040878 | 2/2008 |

* cited by examiner

*Primary Examiner* — Steven Kau
(74) *Attorney, Agent, or Firm* — IPUSA, PLLC

(57) ABSTRACT

A printing system includes a first storage part storing printing partners correlated with respective predetermined printing fields and respective printing quality evaluation degrees; a second storage part storing distribution partners correlated with respective delivery quality evaluation degrees; a printing partner selecting part configured to select a single printing partner whose predetermined printing field matches a printing field to which a print ordered by a user corresponds and whose printing evaluation degree is the highest among the printing partners; a distribution partner selecting part configured to select a single distribution partner whose delivery quality evaluation degree is the highest among the distribution partners; and an order placing part configured to place, via an electrical network, an order for a printing service for printing the print to the single printing partner and an order for a delivery service for delivering the print to the single distribution partner.

3 Claims, 21 Drawing Sheets

FIG.5

| DESIGN PARTNER | LOCATION | BUSINESS DAY | SPECIALTY FIELD |
|---|---|---|---|
| A1 | HOKKAIDO... | MON. TUE. THU. FRI.(9-17) | 1,4 |
| A2 | TOKYO... | MON. THRU FRI.(10-18) | 5,6 |
| A3 | TOKYO... | MON. THRU SAT.(9-18) | 1,2,3 |
| A4 | AICHI... | MON. THRU FRI.(10-20) | 2,3 |
| A5 | OSAKA... | MON. THRU SUN.(9-18) | 4,5,6 |
| .. | .. | .. | .. |

FIG.6

| No | MAIN FIELD | SUB FIELD |
|---|---|---|
| 1 | OFFICE DESIGN | BUSINESS CARD |
| 2 | | COMPANY BROCHURE |
| 3 | | VARIOUS PAMPHLETS |
| 4 | COMMERCIAL DESIGN | POSTER |
| 5 | | ADVERTISING LEAFLET |
| 6 | | ADVERTISING INSERT |
| .. | .. | .. |

FIG.7

DESIGN PARTNER A4
APRIL 2011 SCHEDULE

|  | MON. | TUE. | WED. | THU. | FRI. | SAT. | SUN. |
|---|---|---|---|---|---|---|---|
| 1ST WEEK | – | – | – | – | – | – | – |
| 2ND WEEK | × | × | × | × | ○ | – | – |
| 3RD WEEK | ○ | ○ | ○ | ○ | ○ | – | – |
| 4TH WEEK | ○ | ○ | ○ | ○ | ○ | – | – |
| 5TH WEEK | ○ | ○ | ○ | ○ | × | – | – |

FIG.8

REQUEST RECORD

| REQUEST No | DESIGN PARTNER | DATE OF REQUEST | DATE OF DELIVERY | DELIVERED ITEM | USER EVALUATION |
|---|---|---|---|---|---|
| D201101001 | A1 | 2011/4/1 | 2011/4/3 | D201101001.jpeg | B |
| D201101002 | A2 | 2011/4/1 | 2011/4/5 | D201101002.jpeg | A |
| D201101003 | A1 | 2011/4/1 | 2011/4/4 | D201101003.jpeg | B |
| D201101004 | A4 | 2011/4/2 | 2011/4/9 | D201101004.jpeg | A |
| D201101005 | A5 | 2011/4/2 | 2011/4/3 | D201101005.jpeg | B |
| D201101006 | A4 | 2011/4/2 | 2011/4/10 | D201101006.jpeg | B |
| D201101007 | A3 | 2011/4/2 | 2011/4/10 | D201101007.jpeg | A |
| D201101008 | A1 | 2011/4/2 | 2011/4/5 | D201101008.jpeg | C |
| .. | .. | .. | .. | .. | .. |

FIG.10

| PRINTING PARTNER | LOCATION | BUSINESS DAY | HANDLEABLE FIELD | SPECIALTY FIELD | USER EVALUATION | STAFF TECHNICAL CAPABILITY |
|---|---|---|---|---|---|---|
| B1 | HOKKAIDO··· | MON. TUE. THU. FRI. (9-17) | 1,2,3,4,5,6,7,8,9,10,11,12 | 1,2 | B | A |
| B2 | MIYAGI··· | MON. THRU FRI. (10-18) | 1,2,3,4,5,6,7,8,9,10,11,12 | 3,4,5,6 | A | A |
| B3 | TOKYO··· | MON. TUE. WED. FRI. (9-17) | 1,2,3,4,5,6,7,8,9,10,11,12, 13,16,17,18,19,20,21,22, 23 | 1,2,3,4,5,6,7,8,9,10, 11,12,13,16,17,18, 19,20,21,22,23 | B | B |
| B4 | TOKYO··· | MON. THRU FRI. (10-20) | 1,2,3,4,5,6,7,8,9,10,11,12, 13,16,17,18,19,20,21,22, 23 | 1,2,3,4,5,6,7,8,9,10, 11,12,13,16,17,18, 19,20,21,22,23 | A | A |
| B5 | OSAKA··· | MON. THRU SUN. (9-18) | 3,4,5,6,7,8,9 | 3,4,5,6,7,8,9 | B | B |
| B6 | HIROSHIMA··· | MON. THRU FRI. (10-20) | 11,12,13,16,17,18,19,20, 21 | 16,17,18,19,20,21 | B | B |
| B7 | FUKUOKA··· | MON. THRU SUN. (9-18) | 11,12,13,14,15,16,17,18, 19,20,21,22,23 | 11,12,13,14,15,16, 17,18,19,20,21,22,23 | A | B |
| B8 | US | | 11,12,13,14,15,16,17,18, 19,20,21,22,23 | 16,17,18,19,20,21, 22,23 | C | C |
| ·· | ·· | | ·· | ·· | ·· | ·· |

FIG.11

| No | MAIN FIELD | SUB FIELD |
|---|---|---|
| 1 | BUSINESS CARD | REGULAR SHAPE |
| 2 | | IRREGULAR SHAPE |
| 3 | POSTCARD | REGULAR |
| 4 | | POSTCARD |
| 5 | | GREETING CARD |
| 6 | | PRESSURE-SEALED CARD |
| 7 | ENVELOPE | REGULAR |
| 8 | | WITH WINDOW |
| 9 | | WITH TAPE |
| 10 | STICKER | REGULAR |
| 11 | PRINTING | MONOCHROME |
| 12 | | FOUR-COLOR |
| 13 | | FIVE-COLOR |
| 14 | LARGE-SIZE PRINTING | A0 |
| 15 | | A1 |
| 16 | BOOKBINDING | CASE BINDING |
| 17 | | SADDLE STITCHING |
| 18 | | DELUXE EDITION |
| 19 | | RING |
| 20 | | COIL |
| 21 | | STAPLE |
| 22 | LAMINATE | MAT |
| 23 | | CLEAR |
| ⋮ | ⋮ | ⋮ |

FIG.12

| No | PAPER NAME | RETAINED USABLE INVENTORY VOLUME |
|---|---|---|
| 1 | HIGH-QUALITY THIN PAPER | 100000 |
| 2 | HIGH-QUALITY PAPER | 300000 |
| 3 | COATED PAPER | 200000 |
| 4 | BUSINESS CARD PAPER | 2500 |
| 5 | POSTCARD | 3000 |
| 6 | GREETING CARD | 500 |
| 7 | PRESSURE-SEALED CARD | 1000 |
| 8 | RING | SUFFICIENT |
| 9 | COIL | SUFFICIENT |
| 10 | STAPLE | SUFFICIENT |
| .. | .. | .. |

FIG.13

| RETAINED PRINTER | RELIABILITY (AVAILABILITY) | PRINT QUALITY |
|---|---|---|
| P001 | 99.0% | A |
| P002 | 98.5% | A |
| P003 | 85.0% | B |
| P004 | 99.5% | B |
| P005 | 92.0% | C |

FIG.14

PRINTER P001
APRIL 2011 PROJECTED OPERATION SCHEDULE

|  | MON. | TUE. | WED. | THU. | FRI. | SAT. | SUN. |
|---|---|---|---|---|---|---|---|
| 1ST WEEK | – | – | – | – | – | – | – |
| 2ND WEEK | × | × | ○ | × | ○ | – | – |
| 3RD WEEK | ○ | ○ | ○ | ○ | ○ | – | – |
| 4TH WEEK | ○ | ○ | ○ | ○ | ○ | – | – |
| 5TH WEEK | ○ | ○ | ○ | ○ | ○ | – | – |

FIG.16

| DISTRIBUTION PARTNER | LOCATION | HANDLEABLE SHIPMENT FIELD | SHIPPING BREAKAGE RATE | WRONG SHIPPING RATE | SHIPPING DELAY RATE |
|---|---|---|---|---|---|
| C1 | HOKKAIDO… | 1,2,3,4,5,6 | 0.20% | 0.20% | 2% |
| C2 | HOKKAIDO… | 7 | 0.40% | 0.40% | 3% |
| ⋮ | ⋮ | ⋮ | ⋮ | ⋮ | ⋮ |
| C3 | TOKYO… | 1,2,3,4,5,6,7 | 0.20% | 0.90% | 8% |
| C4 | TOKYO… | 3,4,5,6 | 0.10% | 0.70% | 7% |
| C5 | TOKYO… | 7 | 0.40% | 1.20% | 6% |
| ⋮ | ⋮ | ⋮ | ⋮ | ⋮ | ⋮ |
| B5 | OSAKA… | 1,2,3,4,5,6,7 | 0.20% | 0.70% | 5% |
| ⋮ | ⋮ | ⋮ | ⋮ | ⋮ | ⋮ |
| B6 | HIROSHIMA… | 1,2,3,4,5,6 | 0.20% | 0.40% | 3% |
| ⋮ | ⋮ | ⋮ | ⋮ | ⋮ | ⋮ |
| B7 | FUKUOKA… | 1,2,3,4,5,6,7 | 0.20% | 0.30% | 4% |
| ⋮ | ⋮ | ⋮ | ⋮ | ⋮ | ⋮ |
| B8 | US | 1,2,3,4 | 1.20% | 3.00% | 12% |
| ⋮ | ⋮ | ⋮ | ⋮ | ⋮ | ⋮ |

FIG.17

| No | MAIN FIELD | SUB FIELD |
|---|---|---|
| 1 | LARGE-SIZE CAR | REGULAR SERVICE |
| 2 | | DEDICATED SERVICE |
| 3 | MID-SIZE CAR | REGULAR SERVICE |
| 4 | | DEDICATED SERVICE |
| 5 | COMPACT CAR | REGULAR SERVICE |
| 6 | | DEDICATED SERVICE |
| 7 | MOTORBIKE | DEDICATED SERVICE |
| ⋯ | ⋯ | ⋯ |

FIG.18

PROJECTED DELIVERY SCHEDULE OF APRIL, 2011

| | MON. | TUE. | WED. | THU. | FRI. | SAT. | SUN. |
|---|---|---|---|---|---|---|---|
| 1ST WEEK | — — — — | — — — — | — — — — | — — — — | LARGE-SIZE 5<br>MID-SIZE 5<br>COMPACT 3<br>BIKE 3 | LARGE-SIZE 5<br>MID-SIZE 5<br>COMPACT 4<br>BIKE 3 | LARGE-SIZE 5<br>MID-SIZE 5<br>MID-SIZE 3<br>BIKE 3 |
| 2ND WEEK | LARGE-SIZE 1<br>MID-SIZE 5<br>COMPACT 3<br>BIKE 2 | LARGE-SIZE 1<br>MID-SIZE 5<br>COMPACT 0<br>BIKE 3 | LARGE-SIZE 1<br>MID-SIZE 5<br>COMPACT 0<br>BIKE 1 | LARGE-SIZE 1<br>MID-SIZE 5<br>COMPACT 0<br>BIKE 3 | LARGE-SIZE 5<br>MID-SIZE 5<br>COMPACT 3<br>BIKE 3 | LARGE-SIZE 5<br>MID-SIZE 5<br>COMPACT 4<br>BIKE 3 | LARGE-SIZE 5<br>MID-SIZE 5<br>COMPACT 9<br>BIKE 3 |
| 3RD WEEK | LARGE-SIZE 1<br>MID-SIZE 5<br>COMPACT 2<br>BIKE 3 | LARGE-SIZE 1<br>MID-SIZE 0<br>COMPACT 5<br>BIKE 3 | LARGE-SIZE 5<br>MID-SIZE 5<br>COMPACT 3<br>BIKE 3 | LARGE-SIZE 3<br>MID-SIZE 5<br>COMPACT 3<br>BIKE 3 | LARGE-SIZE 3<br>MID-SIZE 5<br>COMPACT 3<br>BIKE 3 | LARGE-SIZE 5<br>MID-SIZE 5<br>COMPACT 4<br>BIKE 3 | LARGE-SIZE 5<br>MID-SIZE 5<br>COMPACT 8<br>BIKE 3 |
| 4TH WEEK | LARGE-SIZE 2<br>MID-SIZE 2<br>COMPACT 0<br>BIKE 3 | LARGE-SIZE 1<br>MID-SIZE 2<br>COMPACT 2<br>BIKE 3 | LARGE-SIZE 1<br>MID-SIZE 5<br>COMPACT 10<br>BIKE 3 | LARGE-SIZE 1<br>MID-SIZE 2<br>COMPACT 6<br>BIKE 3 | LARGE-SIZE 3<br>MID-SIZE 5<br>COMPACT 3<br>BIKE 3 | LARGE-SIZE 4<br>MID-SIZE 5<br>COMPACT 10<br>BIKE 2 | LARGE-SIZE 5<br>MID-SIZE 5<br>COMPACT 4<br>BIKE 3 |
| 5TH WEEK | LARGE-SIZE 2<br>MID-SIZE 2<br>COMPACT 1<br>BIKE 3 | LARGE-SIZE 1<br>MID-SIZE 3<br>COMPACT 1<br>BIKE 3 | LARGE-SIZE 2<br>MID-SIZE 2<br>COMPACT 3<br>BIKE 2 | LARGE-SIZE 1<br>MID-SIZE 2<br>COMPACT 5<br>BIKE 3 | LARGE-SIZE 3<br>MID-SIZE 5<br>COMPACT 3<br>BIKE 3 | — — — — | — — — — |

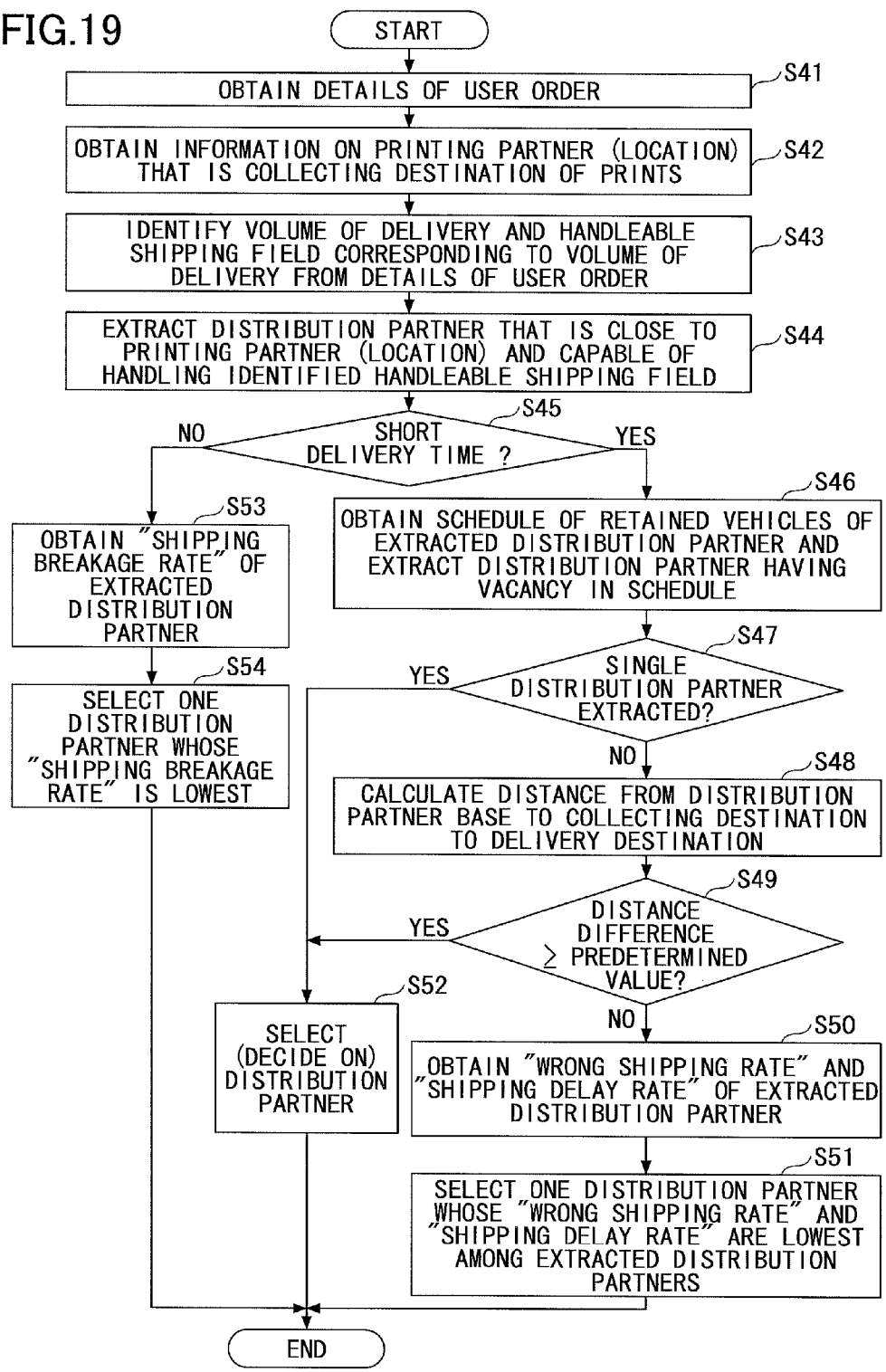

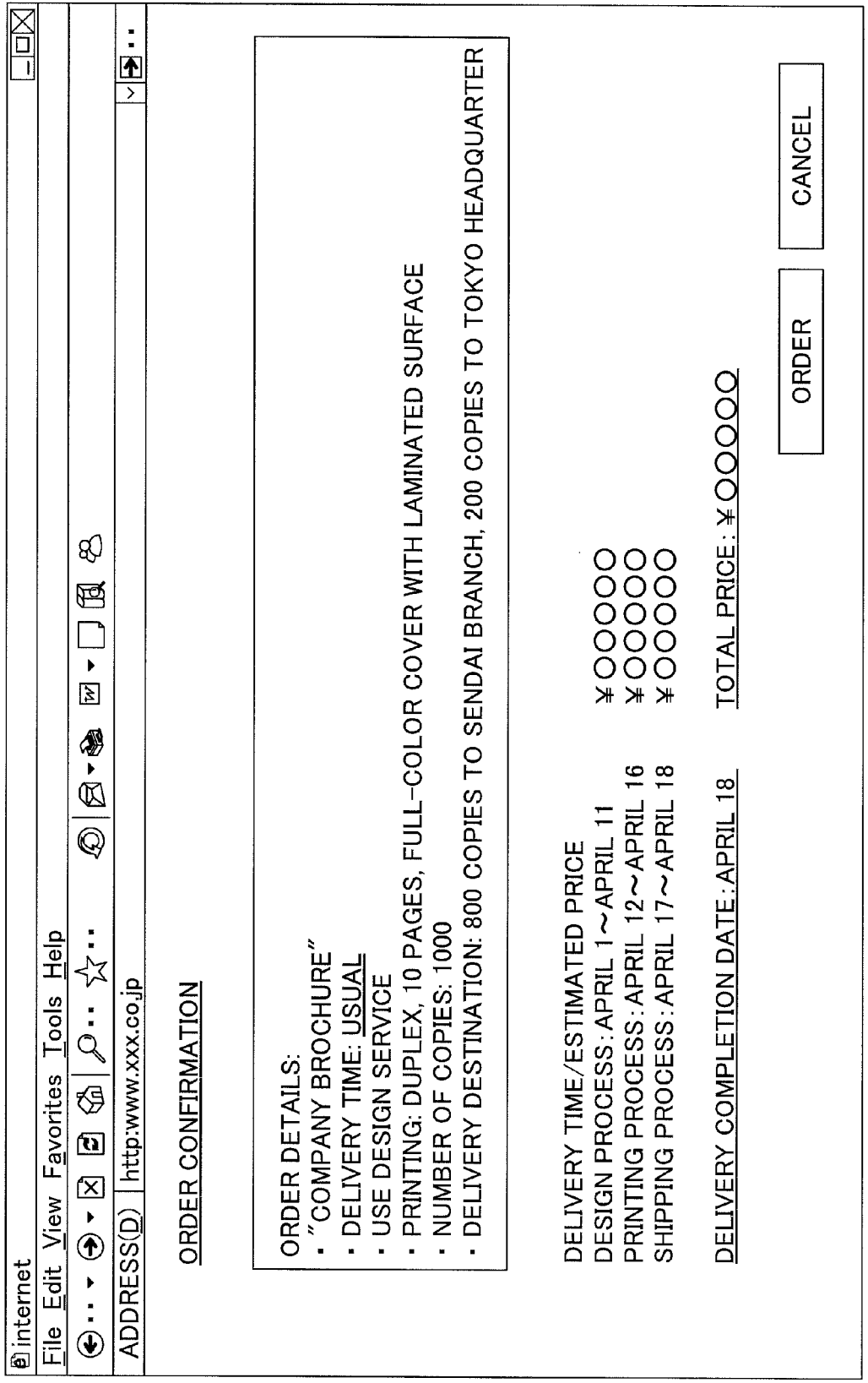

FIG.21

ORDER CONFIRMATION

ORDER DETAILS:
· "COMPANY BROCHURE"
· DELIVERY TIME: SHORT
· USE DESIGN SERVICE
· PRINTING: DUPLEX, 10 PAGES, FULL-COLOR COVER WITH LAMINATED SURFACE
· NUMBER OF COPIES: 1000
· DELIVERY DESTINATION: 800 COPIES TO SENDAI BRANCH, 200 COPIES TO TOKYO HEADQUARTER

DELIVERY TIME/ESTIMATED PRICE
DESIGN PROCESS: APRIL 1～APRIL 9          ￥OOOOO
PRINTING PROCESS: APRIL 10～APRIL 11      ￥OOOOO
SHIPPING PROCESS: APRIL 12～APRIL 13      ￥OOOOO

DELIVERY COMPLETION DATE: APRIL 13    TOTAL PRICE: ￥OOOOO

[ORDER]  [CANCEL]

PRINTING SYSTEM AND BUSINESS PARTNER SELECTION METHOD THAT SELECTS AN OPTIMUM BUSINESS PARTNER CAPABLE OF DELIVERING HIGH-QUALITY PRINTED MATERIALS

CROSS-REFERENCE TO RELATED APPLICATION

The present application is based upon and claims the benefit of priority of Japanese Patent Application No. 2011-126129, filed on Jun. 6, 2011, the entire contents of which are incorporated herein by reference.

BACKGROUND OF THE INVENTION

1. Field of the Invention

The present invention relates to a printing system and a partner selecting method that select an optimum business partner capable of delivering high-quality prints (printed materials) among business partners with which to place orders for individual process services, and to a storage medium storing a program for causing a computer to execute the partner selecting method.

2. Description of the Related Art

In recent years, as digital technologies such as personal computers (PCs) and the Internet have been widely used, the mainstream of prints such as those for sales promotions, brochures, and various business forms has been shifting from the conventional prints based on paper media to those based on electronic media. Paper-medium prints have been replaced by electronic data. For example, sales promotion prints have been replaced by electronic mail, brochures have been replaced with PDF (registered trademark) files, and invoices and checks have been replaced with document files.

In general, paper-medium prints, for which it is necessary to ask a printing company to do printing, cost more for the printing compared with electronic documents. Further, because of the necessity of printing, a certain period of time (delivery time) is necessary for printing and delivering prints before the overall process is completed. On the other hand, the merits of paper-medium prints have been appreciated. Paper-medium prints are acceptable to everyone irrespective of age and gender. Considering characteristics unique to paper-medium prints, such as readability, a sense of ease given to people, and an impression of printing and design so beautiful as to attract people's attention, paper-medium prints have no less merits than electronic documents.

Under these circumstances, printing companies have made various proposals using digital technologies in order to promote usage of paper-medium prints. One of such proposals is cloud printing (also referred to as "Web printing" or the like) that allows one-stop placement of an order for a print via a Web site or a Web browser. From the viewpoint of the ordering side (users), it is possible to easily place an order at any time. For example, a print is delivered to a specified delivery destination by only inputting (uploading) the print data of the print via a Web site, thus simplifying ordering work. Further, from the viewpoint of the order-receiving side (printing companies), it is possible to construct a scheme for performing business activities and providing prints with efficiency.

For example, a user accesses a Web site operated by a printing company or the like (as illustrated in FIG. 1), and places an order for a print by inputting information such as the kind, the number of copies, the shipping address of the print. It is also possible to optionally place a detailed order for special printing or a detailed order with delivery specifics.

Examples of such orders may be "Make 20,000 copies of advertisements to be inserted in newspapers, and send 18,000 copies to Sendai and 2,000 copies to Tokyo in four days," "Bind up a 100-page book and make 500 copies of it," "Provide a full-color cover with a laminated surface," and "Perform duplex printing with 90 monochrome pages and 10 color pages."

Further, the way of inputting an original print differs depending on the kind of a print. For example, in the case of fixed-form prints such as business cards, post cards, and envelopes, a form is selected from several designs and templates provided on a Web site, and is edited as desired and input online. (See, for example, Japanese Laid-Open Patent Application No. 2007-004348). Further, in the case of free-form prints such as company brochures and instruction manuals, a complete original (print data) created by a user is uploaded. Further, in other cases, a designer of a printing company creates a complete original (print data) including a design in response to the input of requests by a user who uses a design service.

In response to completion of the inputting of information, the cloud printing system calculates an estimated price and delivery time (deadline) in accordance with the details of the input order, and causes the estimated price and delivery time on the Web site. (See, for example, Japanese Laid-Open Patent Application No. 2008-040878 and Japanese Laid-Open Patent Application No. 2005-339515.) On the other hand, in response to reception of the order via the Web site, the printing company immediately make arrangements up to completion of the delivery of prints, such as designing (if necessary), printing, and shipping.

SUMMARY OF THE INVENTION

According to an aspect of the invention, a printing system for ordering services of processes up to completion of a delivery of a print via an electrical network in response to an order for the print from a user includes: a first storage part storing a plurality of printing partners providing respective printing services, predetermined printing fields in the printing services provided by the printing partners, and printing quality evaluation degrees indicating printing quality of the printing services provided by the printing partners, the printing partners being correlated with the respective predetermined printing fields and the respective printing quality evaluation degrees; a second storage part storing a plurality of distribution partners providing respective delivery services, and delivery quality evaluation degrees indicating quality of the delivery services provided by the distribution partners, the distribution partners being correlated with the respective delivery quality evaluation degrees; a printing partner selecting part configured to select, from among the printing partners by referring to the first storage part, a single printing partner whose predetermined printing field matches a printing field to which the print ordered by the user corresponds and whose printing evaluation degree is the highest among the printing partners; a distribution partner selecting part configured to select, from among the distribution partners by referring to the second storage part, a single distribution partner whose delivery quality evaluation degree is the highest among the distribution partners; and an order placing part configured to place, via the electrical network, an order for the printing service for printing the print to the single printing partner and an order for the delivery service for delivering the print to the single distribution partner.

According to an aspect of the present invention, a method of selecting partners to which services of processes up to completion of a delivery of a print are ordered via an electrical network in response to an order for the print from a user includes: reading, from a first storage part, a plurality of printing partners providing respective printing services, predetermined printing fields in the printing services provided by the printing partners, and printing quality evaluation degrees indicating printing quality of the printing services provided by the printing partners; reading, from a second storage part, a plurality of distribution partners providing respective delivery services, and delivery quality evaluation degrees indicating quality of the delivery services provided by the distribution partners; selecting, from among the printing partners, a single printing partner whose predetermined printing field matches a printing field to which the print ordered by the user corresponds and whose printing evaluation degree is the highest among the printing partners; selecting, from among the distribution partners, a single distribution partner whose delivery quality evaluation degree is the highest among the distribution partners; and placing, via the electrical network, an order for the printing service for printing the print to the single printing partner and an order for the delivery service for delivering the print to the single distribution partner.

According to an aspect of the present invention, a non-transitory computer-readable storage medium stores a program for causing a computer to execute a method of selecting partners to which services of processes up to completion of a delivery of a print are ordered via an electrical network in response to an order for the print from a user, wherein the method includes: reading, from a first storage part, a plurality of printing partners providing respective printing services, predetermined printing fields in the printing services provided by the printing partners, and printing quality evaluation degrees indicating printing quality of the printing services provided by the printing partners; reading, from a second storage part, a plurality of distribution partners providing respective delivery services, and delivery quality evaluation degrees indicating quality of the delivery services provided by the distribution partners; selecting, from among the printing partners, a single printing partner whose predetermined printing field matches a printing field to which the print ordered by the user corresponds and whose printing evaluation degree is the highest among the printing partners; selecting, from among the distribution partners, a single distribution partner whose delivery quality evaluation degree is the highest among the distribution partners; and placing, via the electrical network, an order for the printing service for printing the print to the single printing partner and an order for the delivery service for delivering the print to the single distribution partner.

The objects and advantages of the embodiments disclosed herein will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 5 illustrates design partner recorded information according to the embodiment;

FIG. 6 illustrates a design field table according to the embodiment;

FIG. 7 is a diagram illustrating information on the schedule of a certain month of a design partner according to the embodiment;

FIG. 8 is a table illustrating a past record of requests to the design partner according to the embodiment;

FIG. 10 illustrates printing partner recorded information according to the embodiment;

FIG. 11 illustrates a printing field table according to the embodiment;

FIG. 12 is a table illustrating a volume of usable inventories retained by a printing partner according to the embodiment;

FIG. 13 is a table illustrating usable printers retained by the printing partner according to the embodiment;

FIG. 14 is a diagram illustrating information on the operation schedule of a certain month of a usable printer retained by the printing partner according to the embodiment;

FIG. 16 illustrates distribution partner recorded information according to the embodiment;

FIG. 17 illustrates a shipping field table according to the embodiment;

FIG. 18 illustrates information on the delivery vehicle schedule of a certain month of a distribution partner according to the embodiment;

FIG. 19 is a flowchart illustrating a distribution partner selecting process according to the embodiment;

FIG. 20 is a diagram illustrating an order confirmation screen of the Web site (in the case of a usual delivery time) according to the embodiment; and FIG. 21 is a diagram illustrating an order confirmation screen of the Web site (in the case of a short delivery time) according to the embodiment.

DETAILED DESCRIPTION OF THE PREFERRED EMBODIMENT(S)

The conventional cloud printing services and Web printing services, however, are not satisfactory in terms of the quality and delivery time of prints delivered. Conventionally, the quality and delivery time of prints are relatively constant if a site operator (cloud printing operator) has its own designers, printing factory, and warehouses, while the site operator uses subcontractors when the site operator is so busy as to go beyond its capacity. Further, if a site operator does not have its own designers, printing factor, or warehouses, the site operator uses affiliated companies or business operators (partners) for one or more of the processes. Therefore, problems have been pointed out, such as the inability to maintain the quality of prints at the same level or above a predetermined level (variations in quality), inconsistent delivery times, and a delay of delivery.

As in the latter case, if a site operator uses affiliated companies (partners) for one or more of the processes, it is highly likely that detailed orders that cannot be handled by a single company, such as those for special printing and those with delivery specifics can be handled. Therefore, this provides users with much convenience in terms of the capability to handle a wide range of user orders. Even in this case, however, the conventional system merely determines one affiliated company after another among multiple affiliated companies in light of the capability to handle user orders, and gives no consideration to the quality of prints to be delivered. That is, the determination of one affiliated company among multiple affiliated companies is not performed in light of quality.

Further, the delivery time is merely a simple sum of the delivery times of the affiliated companies of individual processes such as designing, printing, and shipping, and no consideration is given to reduction in the overall delivery time of prints to be delivered. Although some user orders request an urgent delivery of prints as well as quality (at the expense of some quality), conventionally, the determination of one affiliated company among multiple affiliated companies is not made in light of a delivery time (on the basis of a short delivery time).

According to an aspect of the invention, a cloud printing system and a partner selection method are provided that automatically select (determine), in light of quality in particular, an optimum affiliated company in each of individual processes up to completion of the delivery of prints, such as designing, printing, and shipping.

According to an aspect of the invention, a non-transitory computer-readable storage medium is provided that stores a program for causing a computer to execute the partner selecting method.

A description is given, with reference to the accompanying drawings, of an embodiment of the present invention.

Figure 2:
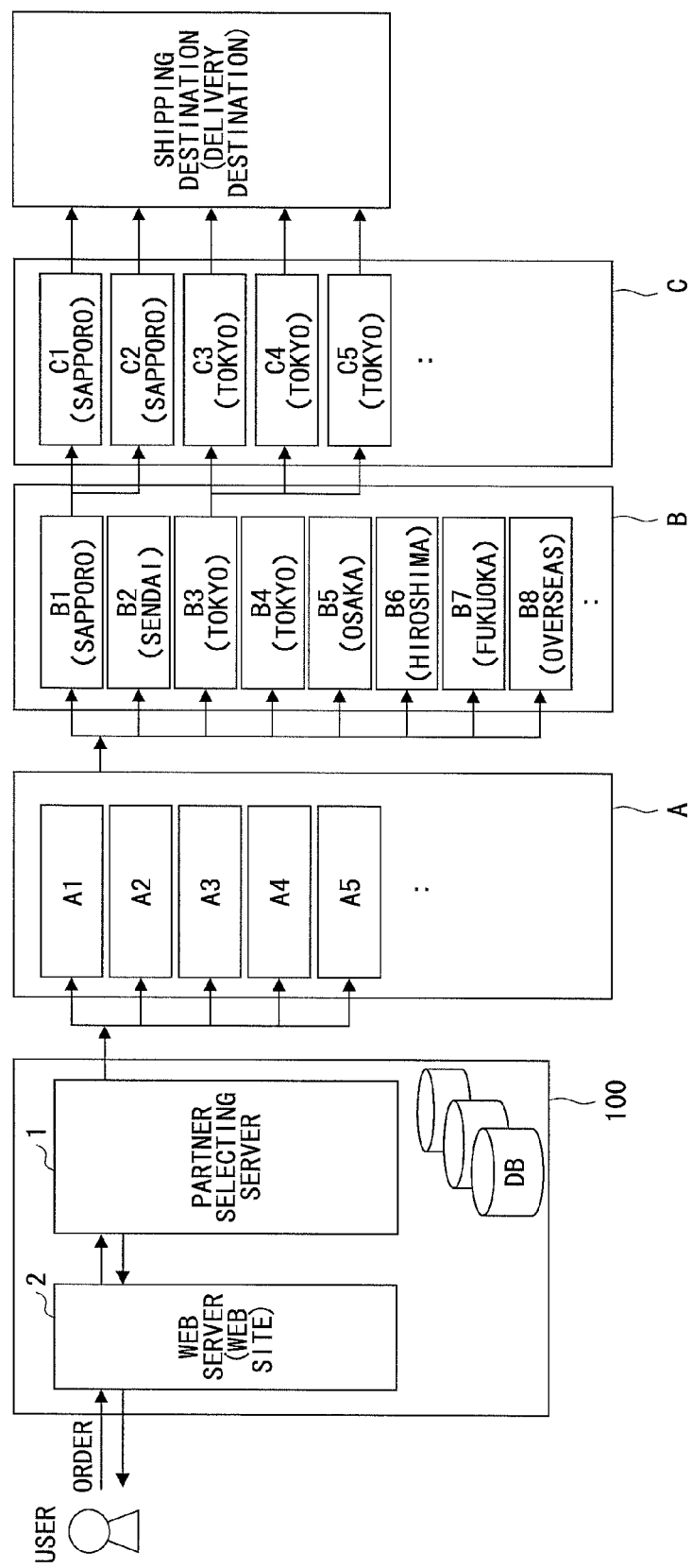
FIG. 2 is a diagram illustrating an overview of a network configuration of a cloud printing system according to an embodiment.

FIG. 2 is a diagram illustrating an overview of a network configuration of a cloud printing system 100 according to this embodiment. The cloud printing system 100 according to this embodiment includes a partner selecting server 1 and a Web server 2. Further, as illustrated in FIG. 2, a user (user PC), design partners A, printing partners B, and distribution partners C are connected to the cloud printing system 100 via a network such as the Internet.

The partner selecting server 1 is configured to select an optimum partner company (business operator) from among multiple partners in each of individual processes up to completion of the delivery of prints (printed materials), that is, designing, printing, and shipping (delivery), in light of quality and a short delivery time in particular in response to receiving an order for prints from the user via the Web server 2. For example, the partner selecting server 1 may be installed in a data center or the like along with the Web server 2.

In response to receiving an order for prints, the partner selecting server 1 selects one of the design partners A (A1, A2 ... A5 ... ) which one best matches up to the user order in terms of quality. Next, the partner selecting server 1 selects one of the printing partners B (B1, B2 ... B8 ... ) which one best matches up to the user order in terms of quality. Next, the partner selecting server 1 selects one of the distribution partners C (C1, C2 ... C5 ... ) which one best matches up to the user order in terms of quality. Then, after selecting a single optimum partner in each of the processes of designing, printing, and shipping, the partner selecting part 1 places an order and make a request for a service to each of the selected partners.

For example, to the selected one of the design partners A (the selected design partner A), the partner selecting part 1 places an order for a design and makes a request for creation of a complete original (print data) in accordance with the details (contents) of the received order for prints. Further, to the selected one of the printing partners B (the selected printing partner B), the partner selecting part 1 makes a request for printing of the complete original (print data) created by the selected design partner A. Further, to the selected one of the distribution partners C (the selected distribution partner C), the partner selecting part 1 makes a request for shipping (delivery) of prints printed by the selected print partner B. Then, the selected distribution partner C delivers the prints to a shipping destination (delivery destination) specified by the user.

Figure 1:
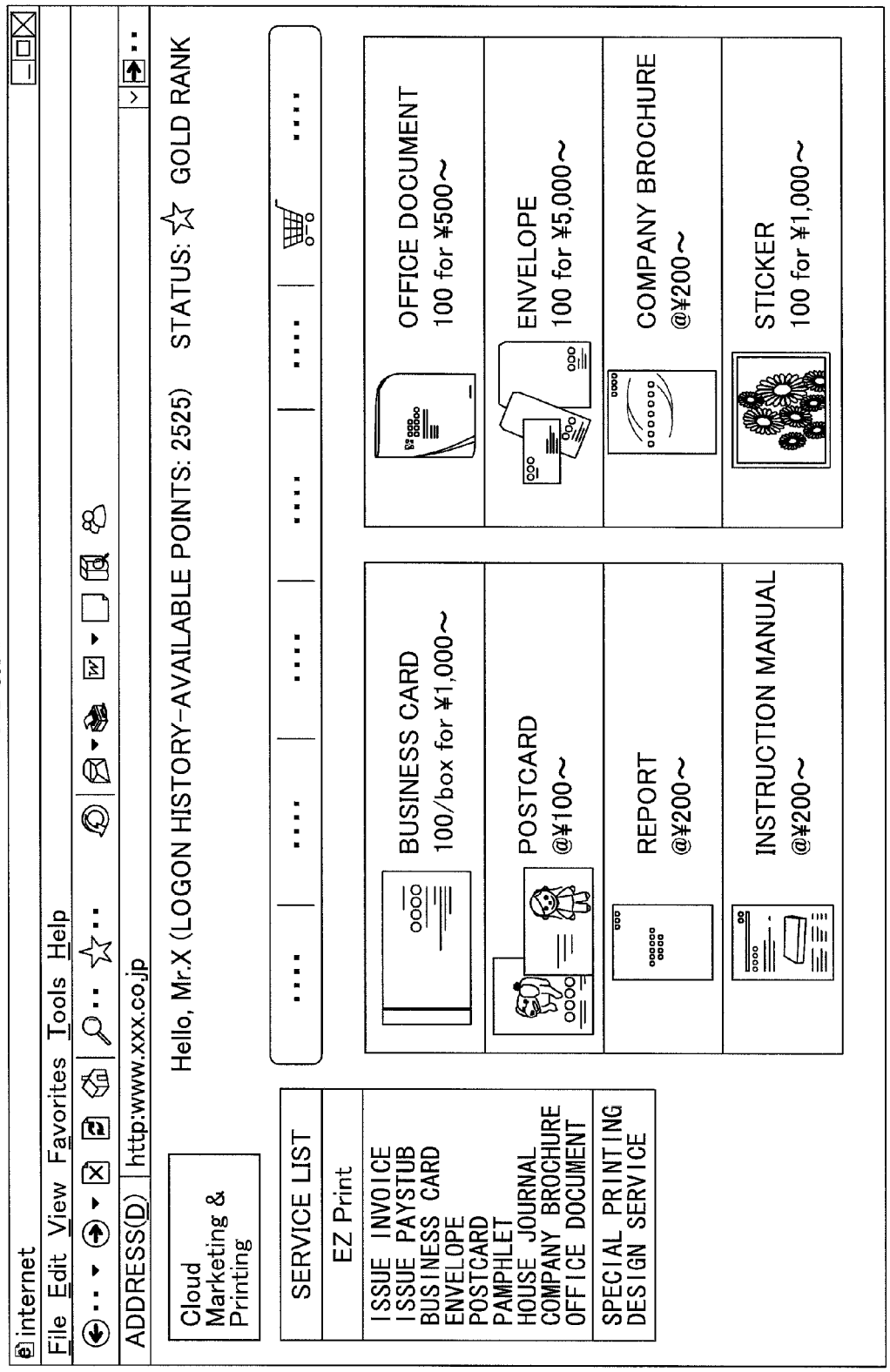
FIG. 1 is a diagram illustrating a Web site.

The Web server 2 provides the Web site (FIG. 1), through which an order for prints is placed, on the Internet. The user is allowed to place an order with ease at any time by accessing the Web site of the Web server 2. The details of the order placed via the Web site are passed to the partner selecting server 1.

The design partners A are design companies (business operators) in charge of designing in the individual processes of designing, printing, and shipping up to completion of the delivery of prints. As illustrated in FIG. 2, there are multiple design partners A. In response to receiving an order for designing from the partner selecting server 1, the selected design partner A creates a design and a complete original (print data) in accordance with the details of the order. The selected design partner A transmits (delivers) the complete original to the partner selecting server 1.

The printing partners B are printing companies (business operators) in charge of printing in the individual processes of designing, printing, and shipping up to completion of the delivery of prints. As illustrated in FIG. 2, there are multiple printing partners B over a wide area, for example, nationwide (or worldwide), and there are multiple printing partners B in each area. In response to receiving an order for printing from the partner selecting server 1, the selected printing partner B prints the complete original in accordance with the details of the order. The prints (copies made by printing the complete original) are passed to the distribution partner C specified (selected) by the partner selecting server 1. For example, since the distribution partner C is a shipping (delivery) company, the prints are picked by the distribution partner C at a specified date and time.

The distribution partners C are shipping companies (business operators) in charge of shipping (delivery), such as carriers, courier companies, messenger bikes, and mail business operators, in the individual processes of designing, printing, and shipping up to completion of the delivery of prints. As illustrated in FIG. 2, there are multiple distribution partners C over a wide area, for example, nationwide (or worldwide), and there are multiple distribution partners C in each area. In response to receiving an order for shipping from the partner selecting server 1, the selected distribution partner C collects the prints from the specified (selected) printing partner B at a specified date and time, and forwards the prints to a specified shipping destination (delivery destination).

In the cloud printing system 100, the partner selecting server 1, the design partners A, the printing partners B, and the distribution partners C are connected via an electrical network. The design partners A, the printing partners B, and the distribution partners C include their respective PC terminals (not graphically illustrated) in order to receive orders from the partner selecting server 1.

According to the cloud printing system 100 of this embodiment, in the case of fixed-form prints such as business cards, post cards, and envelopes, a form may be selected from several designs and templates provided on the Web site of the Web server 2, and may be edited as desired and input online. In the case of free-form prints such as company brochures and instruction manuals, a complete original (print data) created by the user may be uploaded. In this case, designing by the design partner A is unnecessary. Therefore, the partner selecting server 1 may omit selecting a design partner A and start with selecting a printing partner B. In this embodiment, a description is given, assuming that the user uses a design service and the selected design partner A creates a complete original (print data) to be printed.

Figure 3:
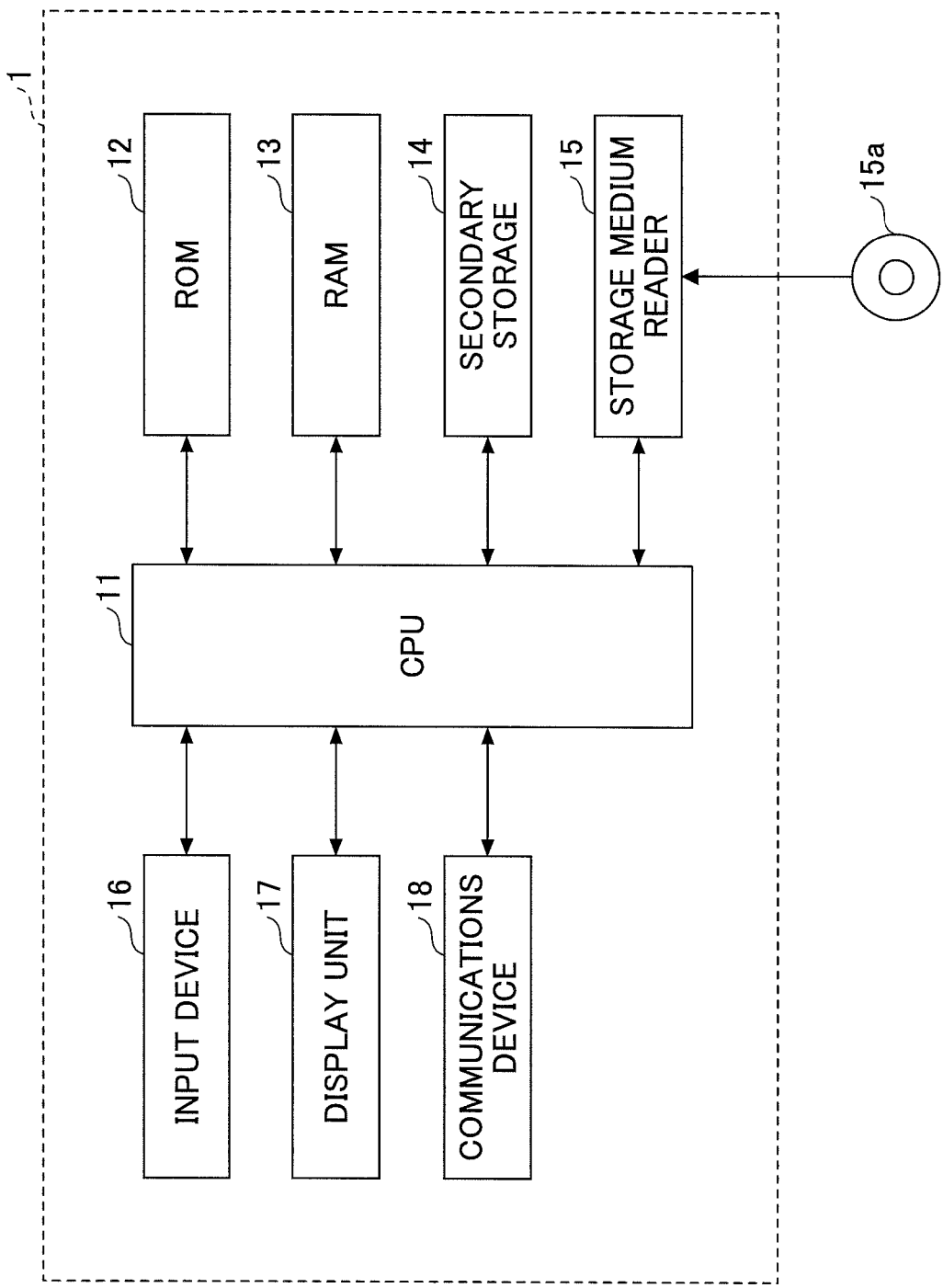
FIG. 3 is a diagram illustrating a hardware configuration of a partner selecting server according to the embodiment.

A description is given of a hardware configuration of the partner selecting server 1 according to this embodiment. FIG. 3 is a diagram illustrating a hardware configuration of the partner selecting server 1 according to this embodiment. The partner selecting server 1 includes a central processing unit (CPU) 11, a read-only memory (ROM) 12, a random access memory (RAM) 13, a secondary storage 14, a storage medium reader 15, an input device 16, a display unit 17, and a communications device 18.

The CPU 11 includes a microprocessor and its peripheral circuits, and performs overall control of the partner selecting server 1. The ROM 12 is a memory that retains a predetermined control program (software component) executed by the CPU 11. The RAM 13 is a memory that is used as a work area when the CPU 11 executes the predetermined control program (software component) retained in the ROM 12 and executes various control processes.

The secondary storage 14 is a nonvolatile storage device that retains various information items including a general-purpose operating system (OS) and various programs, which may include a program for causing a computer to execute a below-described partner selecting method according to this embodiment. The secondary storage 14 may be, for example, a hard disk drive (HDD).

A storage medium (recording medium) 15a, which may store a program for causing a computer to execute a below-described partner selecting method according to this embodiment, may be loaded into the storage medium reader 15. The storage medium reader 15 reads the program from the storage medium 15a. The read program is loaded into the RAM 13 and executed by the CPU 11 so that below-described functions of the partner selecting server 1 are implemented. Examples of the storage medium 15a include magnetic recording media, optical disks, magneto-optical recording media, semiconductor memories, and memory cards. Example of magnetic recording media includes flexible disks and magnetic tapes. Examples of optical disks include digital versatile disk (DVD)s, DVD-random access memory (DVD-RAM)s, compact disk read-only memory (CD-ROM)s, CD-recordable (CD-R)s, and CD-rewritable (CD-RW)s. Examples of magneto-optical recording media include magneto-optical disk (MO)s. Examples of semiconductor memories include electronically erasable and programmable read-only memory (EEPROM)s (including flash memories).

The input device 16 is a device with which a user performs various input operations. The input device 16 includes a mouse, a keyboard, and touchscreen panel switches provided on top of the display screen of the display unit 17.

The display unit 17 is configured to display various data on its display screen. For example, the display unit 17 includes a liquid crystal display (LCD) or a cathode ray tube (CRT).

The communications device 18 is configured to perform communications with other apparatuses via a network. The communications device 18 supports communications according to various forms of networks including a wired network and a wireless network.

Figure 4:
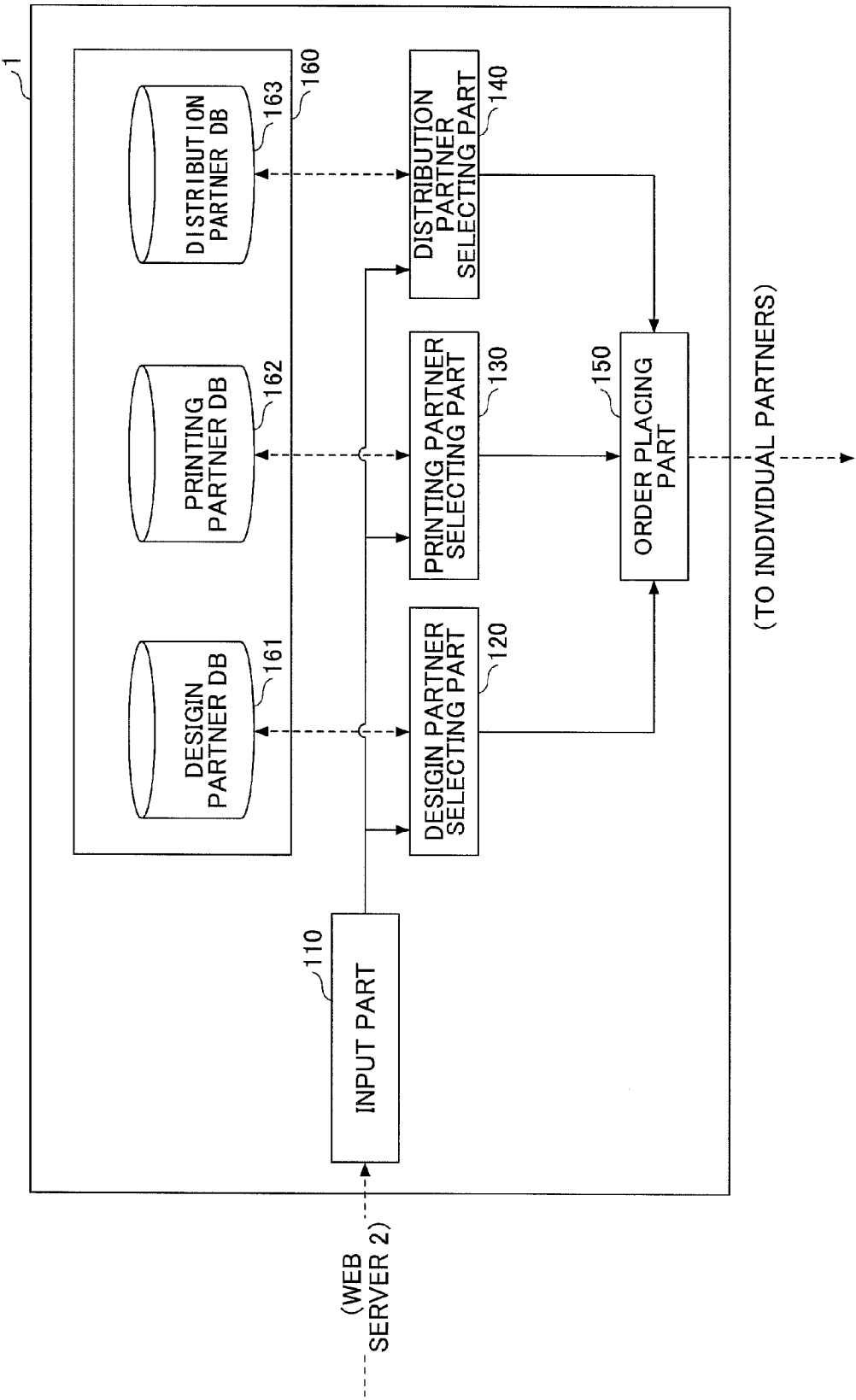
FIG. 4 is a functional block diagram of the partner selecting server according to the embodiment.

Next, a description is given of a functional configuration of the partner selecting server 1 according to this embodiment. FIG. 4 is a functional block diagram of the partner selecting server 1 according to this embodiment. Referring to FIG. 4, the partner selecting server 1 includes an input part 110, a design partner selecting part 120, a printing partner selecting part 130, a distribution partner selecting part 140, an order placing part 150, and a storage part 160.

The input part 110 is a functional part that inputs the details of a user order from the Web server 2. As described above, the user accesses the Web site of the Web server 2 to place an order for prints. The details of the order placed via the Web site is passed (transmitted) to the input part 110 of the partner selecting server 1.

In response to receiving an order for the design of prints from the user, the design partner selecting part 120 selects a design partner A that best matches up to (suits) the user order (an optimum design partner A) from among the multiple design partners A registered with (recorded in) a design partner database (DB) 161 of the storage part 160 in light of quality in particular. A detailed description is given below of the selection method.

In response to receiving an order for printing (making prints) from the user, the printing partner selecting part 130 selects a printing partner B that best matches up to (suits) the user order (an optimum printing partner B) from among the multiple printing partners B registered with (recorded in) a printing partner database (DB) 162 of the storage part 160 in light of quality in particular. A detailed description is given below of the selection method.

In response to receiving an order for shipping from the user, the distribution partner selecting part 140 selects a distribution partner C that best matches up to (suits) the user order (an optimum distribution partner C) from among the multiple distribution partners C registered with (recorded in) a distribution partner database (DB) 163 of the storage part 160 in light of quality in particular. A detailed description is given below of the selection method.

The order placing part 150 makes requests for designing, printing, and distribution (shipping) to the design partner A, the printing partner B, and the distribution partner C selected in the design partner selecting part 120, the printing partner selecting part 130, and the distribution partner selecting part 140, respectively. Further, at the time of making requests, the details of the user order are included in the requests to the design partner A and the printing partner B, and information such as a delivery date and time is included in the request to the distribution partner C.

The design partner DB 161, the printing partner DB 162, and the distribution partner DB 163 are recorded in the storage part 160. The design partner selecting part 120, the printing partner selecting part 130, and the distribution partner selecting part 140 select respective single optimum partners based on the information of these databases. A detailed description is given below of these selections and configuration of the databases.

In practice, the CPU 11 of the partner selecting server 1 executes a program to cause a computer to implement the above-described functions. Further, this embodiment illustrates one configuration, and the individual functional parts may be implemented in an external apparatus or another server. For example, the storage part 160 containing the DBs 161 through 163 may be constructed using another server.

A description is given of information processing of the cloud printing system 100 according to this embodiment. That is, in response to receiving an order for prints from the user via the Web server 2, the partner selecting server 1 selects an optimum partner from among multiple partners (the design partners A, the printing partners B, and the distribution partners C) in each of the individual processes of designing, printing, and shipping up to completion of the delivery of prints in light of quality and a short delivery time in particular.

A description is given below individually of (a) a user order inputting step, (b) a design partner selecting step, (c) a printing partner selecting step, (d) a distribution partner selecting step, and (e) a partner requesting step.

[(a) User Order Inputting Step]

In the user order inputting step, the input part 110 inputs the details of a user order from the Web server 2. As described above, the user accesses the Web site (FIG. 1) of the Web server 2 and places an order for prints. The details of the order placed via the Web site are passed to the input part 110 of the partner selecting server 1.

Here, by way of example, it is assumed that an order is placed from the user with the following specifics:

Company Brochure
Delivery Time: Usual
Use a Design Service
Design Requests (design outline, text information, a requested image drawing, other requests, etc.)
Printing: Duplex, 10 pages, and a full-color cover with a laminated surface
Number of copies: 1000
Delivery Destination: 800 copies to the Sendai branch and 200 copies to the Tokyo headquarter.

The user is allowed to enter order specifics such as the kind of prints, the kind of a delivery time, whether to use a design service, design requests, special printing and delivery that the user wishes to order (specify) on the Web page (FIG. 1) of the Web server 2, so that the order details as described above may be received.

[(b) Design Partner Selecting Step]
[Design Partner DB 161]

First, a description is given, with reference to FIG. 5 through FIG. 8, of a configuration of the design partner DB 161. The design partner DB 161 includes information items and tables shown below. FIG. 5 illustrates design partner recorded information. FIG. 6 illustrates a design field (area) table. FIG. 7 is a diagram illustrating information on the schedule of a certain month of a design partner A. FIG. 8 is a table illustrating a past record of requests to a design partner A.

The design partner recorded information of FIG. 5 includes information such as "Location", "Business Day", and "Specialty Field" of each of affiliated design partners A based on their advance reports.

The item of "Location" indicates the location of the design partner A. The item of "Business Day" indicates the business days (days and hours of the week). In principle, these business days and hours are when the design partner A is capable of doing business. The item of "Specialty Field" illustrates a design field at which the design partner A excels in particular. A list of design fields is illustrated in the design field table of FIG. 6. The number (No.) of a design field at which the design partner A excels in particular in FIG. 6 is stored in the item of "Specialty Field." For example, "Specialty Field" of the design partner A3 is 1 (business card), 2 (company brochure), and 3 (various brochures), which indicates that the design partner A3 does business with office-related designs as its main field or specialty field of business.

The item of "Handleable Field" as a field that may be handled in a fashion by the design partner A may be provided in addition to "Specialty Field," but in this embodiment, it is supposed that each design partner A is capable of handling all design fields. Further, items such as "Telephone Number" and "E-mail Address" may be provided in addition to "Location."

The categories of design fields are pre-recorded in the design field table of FIG. 6 in order to identify "Specialty Field" of the design partner A. The design fields are not limited to those described in FIG. 6, and may include other various design fields.

The information on the schedule of a certain month of the design partner A of FIG. 7 is so-called schedule information of the registered design partner A. For example, the schedule information illustrated in FIG. 7 is the April, 2011 schedule (calendar) of the design partner A4, which illustrates availability (vacancy) in the schedule in the business days of the design partner A2. In FIG. 7, a circle indicates an available business day, and a cross indicates a business day that has already been filled up. In the case of making a request for designing to the design partner A, the design partner A is selected that has a vacancy in the schedule to be able to respond to the request. The design partner DB 161 contains the schedule information of all the design partners A, and it is assumed that the schedule information is updated on a daily basis based on reports from the design partners A. In the case of FIG. 7, the schedule is illustrated day by day. However, the schedule may also be illustrated with calendar days broken down into hours.

The partner request record information of FIG. 8 is a record of requests for designing (design requests) made previously (in the past) by the partner selecting server 1 in response to receiving user orders. The item of "Request No." is an identification number issued uniquely for each design request. The item of "Design Partner" is a design partner A to which a design request was made. The item of "Date of Request" is a date on which the design request was made. The item of "Date of Delivery" is a date on which the design partner A delivered the designed complete original in response to the design request.

Further, the specific item referred to by "Delivered Item" is the filename of the complete original (print data) designed and delivered by the design partner A. The substance of the file data is separately stored in the storage area of the design partner DB 161. The item of "User Evaluation" is the degree of evaluation (for example, A, B, C, etc.) of the design partner A with respect to the finishing and quality of the complete original designed and delivered. This degree of evaluation is added ex-post on a delivered complete original basis based on the feedback (for example, through word of mouth, etc.) from the user.

[Design Partner Selecting Process]

Figure 9:
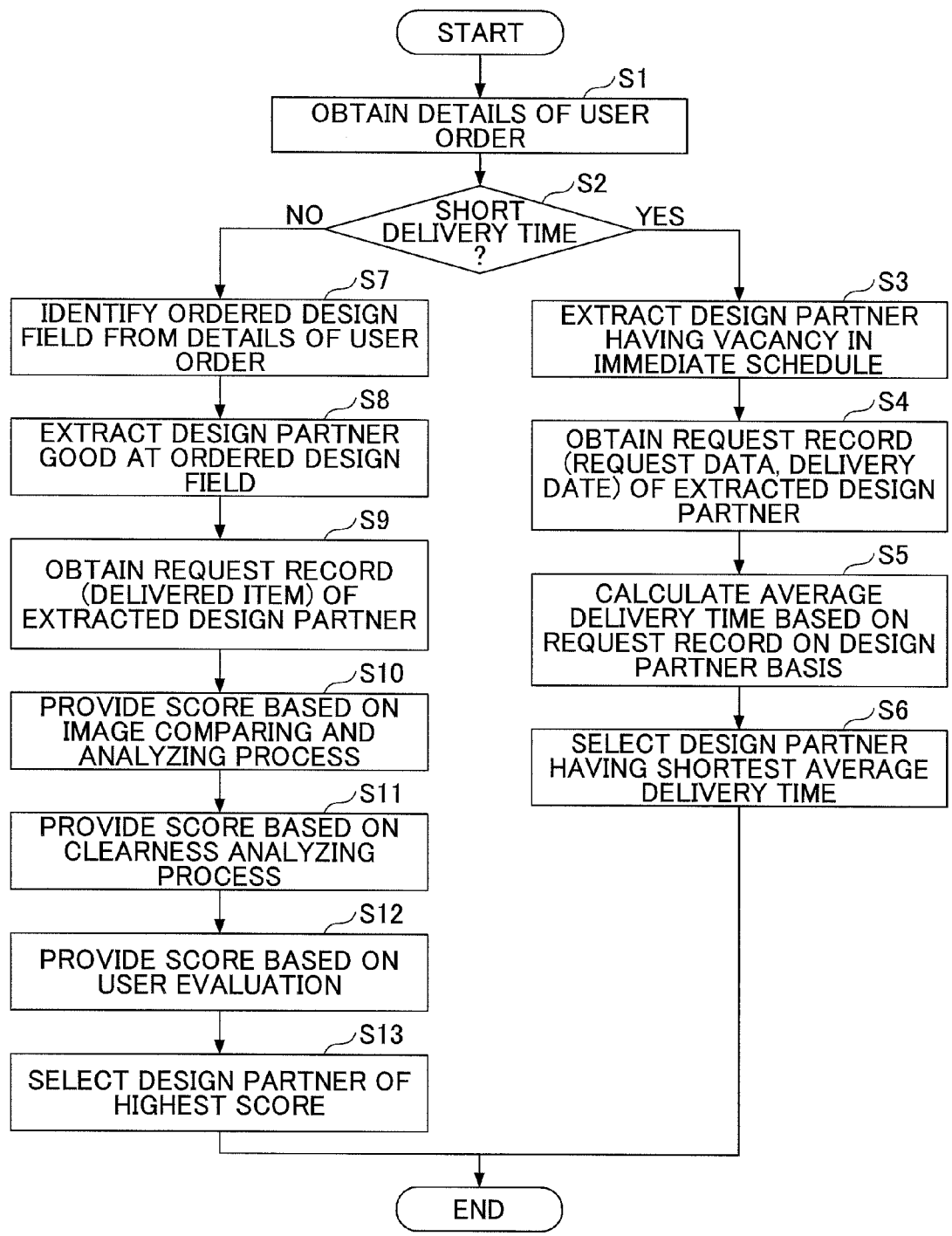
FIG. 9 is a flowchart illustrating a design partner selecting process according to the embodiment.

FIG. 9 is a flowchart illustrating a design partner selecting process according to this embodiment. As described above, in response to receiving an order for the design of prints from the user, the design partner selecting part 120 selects one design partner A that best matches up to the user order from among the multiple design partners A registered with the design partner DB 161 in light of quality and a short delivery time in particular. A detailed description is given with reference to the drawings.

First, in step S1, the design partner selecting part 120 obtains the details of a user order from the input part 110. Here, of the above-described details of the user order, "Company Brochure," Usual Delivery Time, Use of a design service, and Design Requests (a design outline, text information, a requested image drawing, other requests, etc.) are obtained as design-related information. Since the design service is to be used, the following design partner selecting process is executed.

As described above, according to the cloud printing system 100 of this embodiment, in the case of fixed-form prints, a form may be selected from several designs and templates provided on the Web site of the Web server 2, and may be edited as desired and input online. In the case of free-form prints, a complete original (print data) created by the user may be uploaded. In this case (in the case of not using a design service), designing by the design partner A is unnecessary. Therefore, the partner selecting server 1 may omit selecting a design partner A and proceed to a process for selecting a printing partner B.

In step S2, it is determined whether the delivery time is short. That is, if the details of the user order include (request) a short deliver time (an urgent delivery) (YES in step S2), the process proceeds to step S3. If the details of the user order does not include a short delivery time, that is, the delivery time is usual (NO in step S2), the process proceeds to step S7. In the case of a short delivery time (an urgent delivery), the process proceeds to step S3 in order to select a design partner A in terms of how it is possible to deliver a complete original in a short delivery time. On the other hand, in the case of a usual delivery time, the process proceeds to step S7 in order to select a design partner A in terms of how it is possible to deliver a complete original with high quality in response to the details of the user order.

In the case of a short delivery time (an urgent delivery), in step S3, the design partner selecting part 120 extracts one or more design partners A that have a vacancy in their immediate schedules. For example, the design partner selecting part 120 checks the immediate schedule information of each design partner A, referring to the schedule information (FIG. 7), and selects one or more design partners A that have a "circle" in their schedules.

The determination as to whether there is a "circle" (vacancy) in the schedule may be made in various ways. For example, there may be a vacancy only on the day of the placement of the order. Alternatively, it may be determined that there is a vacancy if there is a vacancy for consecutive days including the day of the placement of the order or if there is a vacancy on one of these days even though there is no vacancy on the day of the placement of the order. Here, priorities are set in order of having a vacancy for consecutive days including the day of the placement of the order, having a vacancy only on the day of the placement of the order, and having a vacancy on one of these days even though there is no vacancy on the day of the placement of the order, and in the case of a short delivery time requesting an urgent delivery, design partners A having a vacancy for consecutive days including the day of the placement of the order are determined as having a "circle" in the schedule, and made a top priority. Here, for convenience of description, it is assumed that the design partner A3 and the design partner A4 have a vacancy for consecutive days including the day of the placement of the order. (It is determined that the design partner A3 and the design partner A4 have a "circle" in their schedules.)

In step S4, the design partner selecting part 120 obtains the records of requests (the dates of request and the dates of delivery) of the design partners A that have been extracted. For example, referring to the design partner request record information (FIG. 8), the design partner selecting part 120 obtains the date of request and the date of delivery of each of the design partners A3 and A4.

In step S5, the design partner selecting part 120 calculates an average delivery time on a design partner basis based on the obtained records of requests. For example, this average delivery time may be calculated from a difference in the number of days between the date of request and the date of delivery in the record of requests. For example, if calculated from the data illustrated in FIG. 8 alone, the average delivery time of the design partner A3 is eight days, and the average delivery time of the design partner A4 is 7.5 days.

In step S6, the design partner selecting part 120 determines one design partner A having the shortest average delivery time based on the average delivery times calculated on a design partner basis. In the case where the details of the user order include a short delivery time (an urgent delivery), the delivery time is made a top priority (preferred over any other details), and it is possible to deliver a complete original in the shortest period of time by selecting a design partner A capable of making a delivery in a short delivery time without taking quality (described below) into consideration.

At this point, it may be considered that the period of the design process alone is reduced. However, it is clear that this contributes to reduction in the overall period of the processes of designing, printing, and shipping. Here, it is assumed that of the design partner A3 and the design partner A4, the design partner A4 has the shorter average delivery time and accordingly that the design partner A4 is selected as the design partner.

Further, selecting a design partner based only on the average delivery time does not necessarily mean discarding the quality of a design. This is because as long as the design partners A are registered as design partners, all the design partners A are capable of providing a design with quality at a certain level or higher.

Further, in calculating the average delivery time, holidays such as Saturdays and Sundays are not taken into consideration for convenience of description. Therefore, technically speaking, it is desirable to calculate the average delivery time based on the actual business days of the design partner A (see FIG. 5). For example, in the above-described case, the average delivery time of the design partner A3 is determined to be eight days and the average delivery time of the design partner A4 is determined to be 7.5 days. Depending on the calendar at the time, however, if there are a Saturday, a Sunday, and a national holiday between the date of request and the date of delivery of the design partner A3, the average delivery time of the design partner A3 may be calculated to be, for example, five days, so that the design partner A3 may be determined as a design partner having the shortest average delivery time.

In the case of a usual delivery time, in step S7, the design partner selecting part 120 identifies (determines) the ordered design field from the details of the user order. For example, in this case, the design of "Company Brochure" is ordered. Referring to the design field table of FIG. 6, the number (No) of "Company Brochure" is 2. Therefore, the ordered design field is No. 2.

In step S8, the design partner selecting part 120 extracts one or more design partners A that excel at the ordered design field. For example, the design partner selecting part 120 extracts one or more design partners A having "2" recorded in "Specialty Field," referring to the design partner recorded information of FIG. 5. Here, the design partners A that have "Company Brochure" in "Specialty Field" are the design partner A3 and the design partner A4. Since the design is delivered in the form of electronic data, it is assumed that no consideration is given to the physical locations of the design partners A. (That is, the location does not affect the delivery time.)

Next, in step S9, the design partner selecting part 120 obtains the records of requests (delivered items or goods) of the design partners A that have been extracted in order to select a design partner A capable of filling the details of the user order with high quality based on the past delivered items. Here, for example, referring to the design partner request record information of FIG. 8, the design partner selecting part 120 obtains the substance data of the delivered items of the design partner A3 and the design partner A4. In "Delivered Item," the filename of the complete original (print data) designed and delivered by the design partner A is recorded. Therefore, the substance data of the file may be obtained based on the filename. For example, if obtained from the data illustrated in FIG. 8 alone, the substance data of the delivered item of the design partner A3 are "D201101007.jpeg" and the substance data of the delivered items of the design partner A4 are "D201101004.jpeg" and "D201101006.jpeg."

Next, in step S10, the design partner selecting part 120 provides a score based on an image comparing and analyzing process (an image comparing and analyzing part). The image comparing and analyzing process has an object of analyzing the substance data of the items that have been delivered by the design partners A and selecting a design partner capable of filling the details of the user order with high quality. For example, first, requested image drawings in design requests from users and images in the substance data of the items that have been delivered by the design partners A are compared. Then, of the substance data of the delivered items, images having many pixels similar in color to those of the corresponding requested image drawings are extracted (similar color extraction). Alternatively, of the substance data of the delivered items, images having many pixels similar in color shape to those of the corresponding requested image drawings are extracted (similar color shape extraction).

In more detail, in the similar color extraction, the image is extracted from the substance data of the delivered item if the order of colors in descending order of their numbers of pixels of the substance data of the delivered item is similar to the order of colors in descending order of their numbers of pixels of the corresponding requested image drawing. The similarity is determined based on whether the descending orders of the numbers of pixels of colors are similar.

An example of similarity is as follows:

Order of colors in descending order of numbers of pixels of the requested image drawing: Yellow 254 pixels, Red 128 pixels, Green 45 pixels, and Blue 16 pixels, Order of colors in descending order of numbers of pixels of the substance data of the delivered item: Yellow 1675 pixels, Red 564 pixels, Greenish yellow 278 pixels, and Blue 68 pixels.

Further, in the similar color shape extraction, the similar color shapes of the requested image drawing and the substance data of the delivered item are superposed, and similarity is determined if the numbers of pixels superposed are approximate values.

Thus, the design images previously created and delivered (in the past) by the design partners A (the substantial data of the delivered items) are stored, and of the stored design images, those similar in color and/or shape to corresponding requested image drawings are extracted. This makes it possible to select a design partner A that has delivered (designed) an item similar in color and/or shape to a requested image drawing. Here, the design partners A are provided with scores in accordance with the degree of similarity and the number of similar pixels between the substantial data of their delivered items and the corresponding requested image drawings. That is, a design partner A that has created and delivered many images similar to corresponding requested images in the past is provided with a high score.

Next, in step S11, the design partner selecting part 120 provides scores based on a clearness analyzing process. This clearness analyzing process has an object of analyzing the substantial data of the items that have been delivered by the design partners A and selecting a design partner A that provides a beautiful and clear design. Unlike in artistic fields, in the field of designs for business purposes, the power of appeal upon those who see the design is considered important. That is, with respect to office designs and commercial designs, compared with designs in artistic fields, more beautiful and clearer designs have stronger appeal power. For example, brightness and the degree of contrast are calculated from images inside the substantial data of the items that have been delivered by the design partners A, and, for example, design partners A that have created and delivered many images with a high total value of the brightness and the degree of contrast are provided with a high score.

Next, in step S12, the design partner selecting part 120 provides scores based on evaluations in order to select a design partner A that may continue to be capable of providing high quality based on the evaluations of the items that have been delivered by the design partners A. For example, referring to the design partner request record information of FIG. 8, the design partner selecting part 120 extracts the degree of evaluation recorded in "User Evaluation" on a design partner basis. Here, the design partner A3 has received an evaluation of "A" and the design partner A4 has received an evaluation of "A" and an evaluation of "B." In this step as well, a design partner A having a good (high) degree of evaluation is provided with a high score.

In step S13, based on the above, the design partner selecting part 120 eventually selects one of the design partners A which one has the highest score. Here, it is assumed that of the design partner A3 and the design partner A4, the design partner A3 has the higher score and accordingly is selected as the design partner.

The user accesses the Web site (FIG. 1) of the Web server 2 and places an order for prints. In the case of a member user, a design partner A to which the user has placed an order in the past may be specified based on the past order history. In this case, the design partner selecting part 120 re-selects the same design partner A based on the order history, the request history, etc. Therefore, it is possible to maintain the same design quality as in the past for the member user.

When the user places an order for prints on the Web site (FIG. 1), a delivery time (and an estimated price) is caused to be displayed. It is possible to receive (accept) an order without displaying a delivery time (and an estimated price). However, in terms of user convenience, it is desired to clearly display a delivery time (and an estimated price) as much as possible. Therefore, in addition to selecting a partner in each process, the partner selecting server 1 calculates a delivery time in each of the processes of designing, printing, and shipping, and then calculates an overall delivery time by totaling the delivery times of the individual processes.

The design partner selecting part 120 determines the delivery time of the design process (a period up to completion of a designed original print) in each of the case of a usual delivery time and the case of a short delivery time as follows. First, in the case where the user order requests a usual delivery time, a predetermined period agreed upon beforehand with each design partner A in accordance with the details of a design order and accompanying design work is determined as the delivery time of the design process (for example, 10 days for a company brochure).

On the other hand, in the case of a short delivery time, the delivery time of the design process is flexibly changed. For example, in the above-described case, the design partner A is selected because of its shorter average delivery time (7.5 days). In this case, for example, the average delivery time of the design partner A4 is adopted as the delivery time of the design process, and 7.5 days may be determined as the delivery time of the design process. In another case, for example, an extra day may be reserved for the average delivery time of the design partner A4, and the delivery time of the design process is calculated by adding one day (reserved) to the average delivery time to be determined to be 8.5 days. However, as described above, it is desired to determine the delivery time on an actual business day basis. That is, if the delivery time extends over a Saturday, a Sunday, etc., the date of completion of the design is determined taking a Saturday, a Sunday, etc., into consideration.

Further, in response to receiving an order for designing, in the case of a usual delivery time, each of the design partners A makes a delivery, strictly observing a predetermined period agreed upon beforehand, although there may be some exceptional cases where the delivery deadline is missed. Some design partners A make a quick delivery, for example, in around five or six days, while the usual delivery time is, for example, 10 days. Such design partners A may be determined from the past average delivery time as illustrated above. Such design partners A have such production capacity as to be able to process a current order with a delivery time (and a reserve day) corresponding to the past average delivery time. Therefore, if the user order requests a short delivery time, a delivery time (and a reserve day) corresponding to the past average delivery time is determined as the delivery time of the design process (for example, 7.5 days). It is agreed upon with each of the design partners A that the cloud printing system 100 determines the delivery time in the above-described manner in the case of a usual delivery time.

In the above-described embodiment, in the case of a usual delivery time (in the case where the delivery time is not short), a design partner A is selected in light of quality, but is not selected in light of a short delivery time. This is because since the delivery time is not short, it is not necessarily required to find a design partner A that is available at this point. That is, in the case of a usual delivery time, a design partner A is selected in terms of quality. The design partner A may have no vacancy in the schedule at this point. Even if there is no vacancy in the schedule at this point, a delivery is to be made within the delivery time of the design process agreed upon beforehand with each design partner A.

Further, in the above-described embodiment, the process diverges at step S2 based on whether the details of the user order include a short delivery time, and in the case of a short delivery time, one of the design partners A having the shortest delivery time is selected based on the average delivery time calculated on a design partner basis. This is because the delivery time is preferred over quality as a top priority when the details of the user order include a short delivery time (an urgent delivery). However, even if the details of the user order include a short delivery time, it is still possible to execute the processes of step S7 through step S13. That is, if multiple design partners A having the shortest delivery time are selected, it is possible to eventually select one design partner A that is capable of making a delivery in a short time and from which quality may be expected by further going through the processes of step S7 through step S13.

[(c) Printing Partner Selecting Step]

First, a description is given, with reference to FIG. 10 through FIG. 14, of a configuration of the printing partner DB 162. The printing partner DB 162 includes information items and tables shown below. FIG. 10 illustrates printing partner recorded information. FIG. 11 illustrates a printing field (area) table. FIG. 12 is a table illustrating a volume of usable inventories retained by a printing partner B. FIG. 13 is a table illustrating usable printers retained by a printing partner B. FIG. 14 is a diagram illustrating information on the operation schedule of a certain month of a usable printer retained by a printing partner B.

Referring to FIG. 10, information such as "Location," "Business Day," "Handleable Field," "Specialty Field," "User Evaluation," and "Staff Technical Capability" is pre-recorded in the printing partner recorded information on an affiliated printing partner basis.

The item of "Location" indicates the location of the printing partner B. The item of "Business Day" indicates the business days (days and hours of the week). In principle, these business days and hours are when the printing partner B is capable of doing business.

The item of "Handleable Field" indicates a printing field that may be handled in a fashion by the printing partner B. A design may be handled in a fashion in a wide range of fields with a design skill, while in printing, the handleable field differs depending on a retained printer. The item of "Specialty Field" illustrates a printing field at which the printing partner B excels in particular. A list of printing fields is illustrated in the printing field table of FIG. 11. In the printing partner recorded information, the number (No.) of a printing field that may be handled by the printing partner B is stored in the item of "Handleable Field," and the number (No.) of a specialty field at which the printing partner B excels is stored in the item of "Specialty Field." For example, the handleable fields of the printing partner B7 include 11 (monochrome printing), 12 (four-color printing), (five-color printing), 14 (A0 size printing), and (A1 size printing), and the specialty fields of the printing partner B7 include 14 and 15, which indicates that the printing partner B7 does business in printing related to large-size posters or large-size advertisements (advertisements on the street) as its main field or specialty field of business. The handleable fields and specialty fields are registered (recorded) in advance based on a report from the printing partner B. Further, which of the handleable fields is registered as specialty fields may be determined based on the subjectivity of (a self report from) the printing partner B or on the basis of objective grounds based on the past handling record or retained facilities.

The item of "User Evaluation" is the degree of evaluation (for example, A, B, C, etc.) of the printing partner B that has been made so far with respect to the finishing and quality of prints. This degree of evaluation is added ex-post based on the feedback (for example, through word of mouth, etc.) from the user or based on an evaluation by the user. The item of "Staff Technical Capability" is the degree of evaluation (for example, A, B, C, etc.) of staff (technicians) belonging to the printing partner B with respect to the technical capability of printing. This degree of evaluation also is added ex-post based on an overall evaluation including the evaluation by the operator of the cloud printing system 100, the number of years of business experience of the staff, and a staff skill evaluation table reported from the printing partner B.

The categories of printing fields are pre-recorded in the printing field table of FIG. 11 in order to identify "Handleable Field" and "Specialty Field" of the printing partner B. The printing fields are not limited to those described in FIG. 11, and may include other various printing fields.

In the item of "Retained Usable Inventory Volume" of FIG. 12, a volume of usable inventories retained by a printing partner B at present is recorded. In addition to a printer, printing requires printing materials (for example, a printing medium such as paper, toner, ink, etc.), and in the first place, it is impossible to perform printing without their inventories. Therefore, this information is used to determine which printing partner B to select based on the presence or absence of retained inventories in selecting a printing partner B in the case of urgency such as a short delivery time. (No request may be made to a printing partner B without inventories.) A volume of usable inventories retained at present is recorded on a printing partner basis in "Retained Usable Inventory Volume," and is updated in real time by each printing partner B.

In the table of FIG. 13, a list of printers retained by a printing partner B at present and the reliability (availability) and the print quality of the printers are recorded. The printing partner B retains printers. Based on this information, the number of printers is determined, and it is understood that the production capability is higher with a larger number of usable (available) printers retained. The item of "Reliability" (availability) indicates the degree of evaluation (for example, A, B, C, etc.) as to whether a printer is normally operable without failures. This degree of evaluation is calculated based on downtime or the number of failures in the past. Therefore, a printer for which this reliability is high is found to be at least an apparatus that has experienced little downtime and may be expected to experience little downtime in the future as well.

The item of "Print Quality" indicates the degree of evaluation (for example, A, B, C, etc.) as to whether a printer is capable of performing high-quality printing without contaminations such as stains due to transferred ink at a printing time. This degree of evaluation is calculated based on the past printing record. Therefore, a printer for which the degree of this printing quality is high (for example, a printer of "A" print quality) is found to be at least an apparatus that has caused few contaminations and may be expected to cause few contaminations in the future as well.

The degree of evaluation of this "Print Quality" may be determined, for example, as follows. In general, when an original print (print data) is input to a printer, a raster image (bmp) is generated, and the raster image is developed onto a drum using toner. The transfer image developed onto the drum is transferred onto a belt, and is then transferred (fixed) onto paper that has been conveyed. Thereby, printing onto the paper is completed, and a print (printed paper) is discharged from the discharge (ejection) opening of the printer.

Based on this, here, first, the transfer image immediately after its transfer onto the belt is scanned, so that transfer image data, which are digital data, are obtained. Then, the transfer image data and the original print (print data) input to the printer are compared. This comparison compares portions without an overlap of the image, and if there is a difference of more than or equal to a predetermined number of pixels, it may be determined that there is a contamination in the transfer image data, that is, there is a drum or belt contamination. This is because in principle, the original print (print data) and the transfer image data immediately after its transfer onto the belt match completely. Therefore, if there are pixels of a difference between the original print (print data) and the transfer image data immediately after its transfer onto the belt, this indicates generation of pixels of a difference at the time of transfer onto the belt. That is, a contamination has been caused at the time of transfer onto the drum or belt.

Further, after the transfer (fixation) of the image onto the paper, a print (printed paper) is discharged from the discharge opening of the printer. By scanning the printed paper immediately before (or after) discharge, the data of the print, which are digital data, are obtained. The data of the print and the previously obtained transfer image data are compared. This comparison compares portions without an overlap of the image, and if there is a difference of more than or equal to a predetermined number of pixels, it may be determined that there is a contamination in the conveyed paper, that is, paper loaded in the printer is contaminated. This is because in principle, the image before and the image after its transfer (fixation) onto the paper match completely. Therefore, if there are pixels of a difference between the transfer image data before transfer (fixation) onto the paper and the data of the print after transfer (fixation) onto the paper, this indicates generation of pixels of a difference at a time other than the time of transfer (fixation) of the transfer image onto the conveyed paper. That is, the original paper is contaminated.

The printers retained by the printing partners B have the above-described function (printing contamination calculating function). If the drum, the belt, or the original paper is contaminated, final prints to be delivered to the user are delivered with contamination. This is a cause of the degradation of the quality of prints. Accordingly, the printers check for contamination every time printing is performed or with predetermined frequency, and calculates and stores a contamination detection rate. By periodically collecting data on this contamination detection rate to the partner selecting server 1 of the cloud printing system 100, it is possible to eventually reflect the contamination detection rate in the degree of evaluation (for example, A, B, C, etc.) of "Print Quality" based on the collected data. That is, if the degree of evaluation of "Print Quality" is high (for example, "A"), it may be determined that prints to be delivered are not contaminated (or very unlikely to be contaminated) so that it is possible to deliver prints of high quality.

According to the above-described function, if the contamination detection rate of a retained printer is high, the printing partners B (technicians) may determine that this is attributable to the drum, the belt, or the original paper. Accordingly, by checking the drum or belt or checking the quality of the original paper, it is possible to make improvement to reduce the contamination detection rate.

The information on the operation schedule of a certain month of a usable printer retained by a printing partner B illustrated in FIG. 14 is information on a projected operation schedule of one of the printers (for example, a printer P001) retained by a printing partner B. For example, FIG. 14 illustrates the schedule table of April, 2011 of one of the printers (P001) retained by a printing partner B, indicating the availability of the retained printer (P001) in its projected operation schedule on the business days of the printing partner B. In FIG. 14, a "circle" indicates that the printer is available and a "cross" indicates that the schedule has been fixed. In the case of making a request for printing to a printing partner B in a case requiring urgency such as the case of a short delivery time, a printing partner B that has a vacancy in the schedule of the retained printers and is able to handle the request is selected. In the printing partner DB 162, information on the projected operation schedule of all retained printers is recorded on a printing partner basis. Further, it is assumed that the information on the projected operation schedule of all retained printers is updated on a daily basis based on reports from the individual printing partners B. Further, in the case of FIG. 14, the schedule is illustrated day by day. However, the schedule may also be illustrated with calendar days broken down into hours.

[Printing Partner selecting Process]

Figure 15:
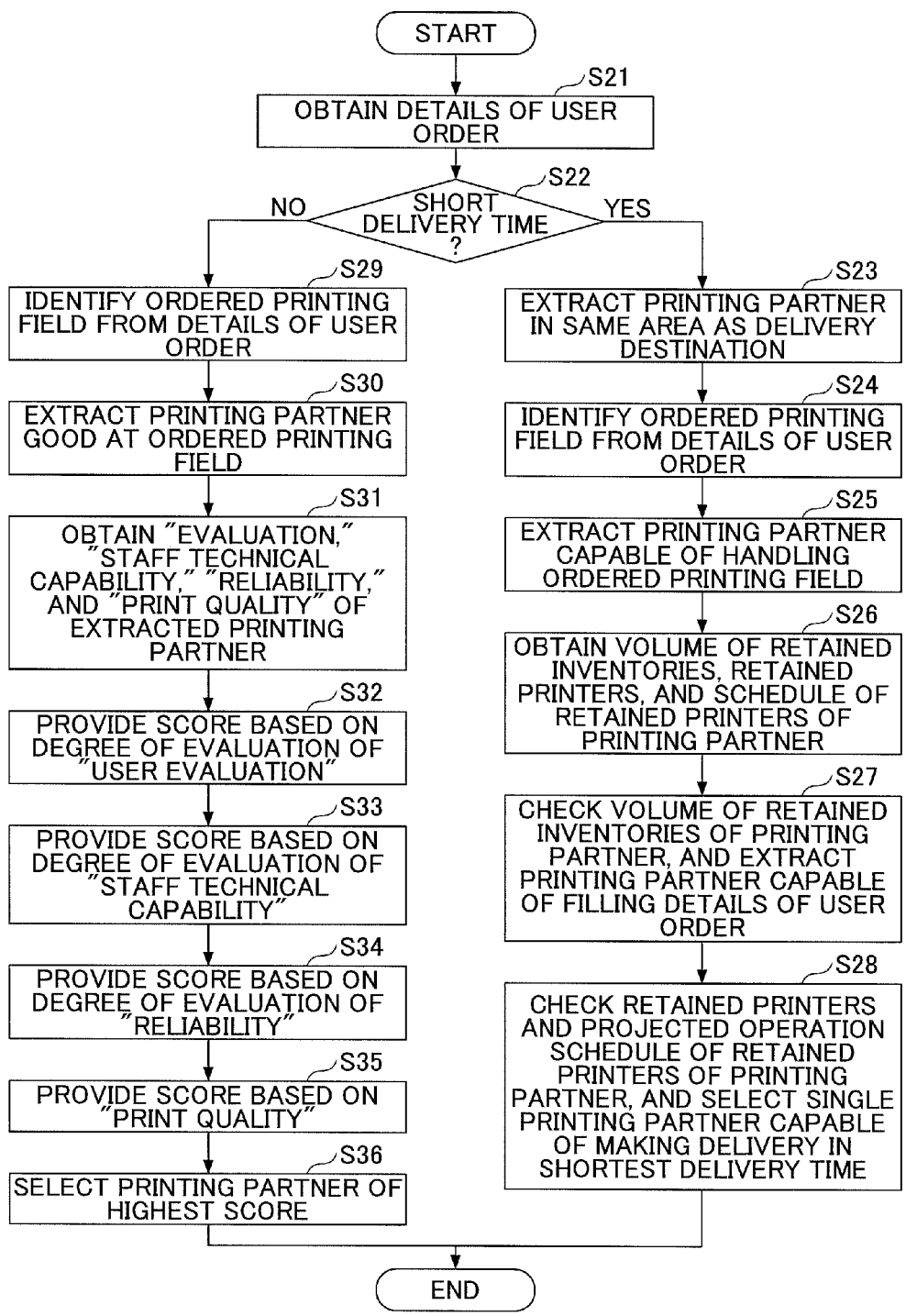
FIG. 15 is a flowchart illustrating a printing partner selecting process according to the embodiment.

FIG. 15 is a flowchart illustrating a printing partner selecting process according to this embodiment. As described above, in response to receiving a printing order for prints from the user, the printing partner selecting part 130 selects one printing partner B that best matches up to the user order from among the multiple printing partners B registered with the printing partner DB 162 in light of quality and a short delivery time in particular. A detailed description is given below with reference to the drawings.

First, in step S21, the printing partner selecting part 130 obtains the details of a user order from the input part 110. Here, of the above-described details of the user order, "Company Brochure," Usual Delivery Time, Duplex Printing, Number of pages: 10, Full-color cover with a laminated surface, and Number of copies: 1000 are obtained as printing-related information. Further, the printing partner selecting part 130 also obtains information on a delivery destination (800 copies to the Sendai branch and 200 copies to the Tokyo headquarter) although the information is related to distribution.

In step S22, it is determined whether the delivery time is short. That is, if the details of the user order include (request) a short deliver time (an urgent delivery) (YES in step S22), the process proceeds to step S23. If the details of the user order does not include a short delivery time, that is, the delivery time is usual (NO in step S22), the process proceeds to step S29. In the case of a short delivery time (an urgent delivery), the process proceeds to step S23 in order to select a printing partner B in terms of how it is possible to deliver prints in a short delivery time. On the other hand, in the case of a usual delivery time, the process proceeds to step S29 in order to select a printing partner B in terms of how it is possible to deliver prints with high quality in response to the details of the user order.

In the case of a short delivery time (an urgent delivery), in step S23, the printing partner selecting part 130 checks the delivery destination of prints, and extracts one or more printing partners B located in the same area (for example, the same prefecture, city, region, etc.) as the delivery destination. This is because printing at a printing partner B in geographical proximity to the delivery destination contributes to reduction in delivery time. Since prints are objects, it is necessary to deliver prints to the delivery destination. Therefore, basically, it is possible to deliver prints in a shorter period of time if performing printing at a printing partner B located closer to the delivery destination (shipping destination). Therefore, it is desirable to organize a printing partner network with many printing partners across the country.

Here, based on the details of the user order, 800 copies and 200 copies are to be delivered to the Sendai branch and the Tokyo headquarter, respectively, as delivery destinations. Therefore, the printing partners B2, B3, and B4 located in Sendai or Tokyo are extracted (FIG. 2 and FIG. 10).

Next, in step S24, the printing partner selecting part 130 identifies (determines) ordered printing fields from the details of the user order. Here, for example, printing of "Company Brochure," Duplex Printing, Number of pages: 10, and Full-color cover with a laminated surface is ordered. Therefore, referring to the printing field table (FIG. 11), this printing order corresponds to Printing (four-color printing), Bookbinding (Deluxe Edition), and Laminate (Mat). Therefore, the ordered printing fields are No. 12, No. 18, and No. 22.

In step S25, the printing partner selecting part 130 extracts one or more printing partners B capable of handling the ordered printing fields. In the case of a short delivery time, at least a printing partner B having such a production capability as to be able to fill the user order is selected. (As described below, in the case of a usual delivery time, a printing partner B that excels at the ordered printing fields is extracted.) For example, referring to the printing partner recorded information (FIG. 10), a printing partner B for which No. 12, No. 18, and No. 22 are registered (recorded) in "Handleable Field" is extracted. Here, the printing partner B3 and the printing partner B4 have these printing fields registered as handleable fields.

Next, in step S26, the printing partner selecting part 130 obtains information on the current volume of inventories (FIG. 12), the retained printers (FIG. 13), and the projected operation schedule of each retained printer (FIG. 14) of the printing partners B that have been extracted as information for estimating their current production capabilities. The projected operation schedule of each retained printer (FIG. 14) is caused to correspond to the delivery deadline of the design process, and the projected operation schedule of each retained printer at the date of completion of designing is obtained. That is, for example, if the delivery time of a design process is 10 days as described above, the projected operation schedule of the 11th day from the date of the user order (the day after the delivery deadline of the design process) may be obtained. Further, if the delivery time of a design process is 7.5 days, the projected operation schedule of the 9th day from the date of the user order (the day after the delivery deadline of the design process) may be obtained.

Next, in step S27, the printing partner selecting part 130 checks the volumes of inventories retained by the printing partners B, and extracts a printing partner B capable of filling the user order. That is, a printing partner B that retains printing materials necessary for performing printing of prints ordered by the user as inventories is extracted. Here, as described above, the details of the user order are "Company Brochure," Duplex Printing, Number of pages: 10, Full-color cover with a laminated surface, and Number of copies: 1000. In this case, in order to respond to the user order with a short delivery time, it is necessary to have, for example, 5000 sheets of high quality paper and materials for laminate processing in inventory at this point. Here, it is assumed that each of the printing partner B3 and the printing partner B4 has a sufficient volume of inventories. If the printing partner B is uniquely determined at this step, that is, a single printing partner B is extracted at this step, the extracted printing partner B may be selected. If there is only one printing partner B that has a volume of inventories that fills the details of the user order, it is desirable to select the printing partner B in terms of a short delivery time.

Next, in step S28, the printing partner selecting part 130 checks the retained printers and their projected operation schedules of the printing partners B, and selects one of the printing partners B that is capable of making a delivery in the shortest delivery time. If a printing partner B has a large number of printers and there is a vacancy in the projected operation schedule of the retained printers, the printing partner B has a high production capability and is capable of filling the details of the user order in a short delivery time.

For example, a standard term of work of printing (delivery time) for the details of the user order may be calculated by converting the details of the user order. Here, it is assumed that the standard term of work of printing (delivery time) for printing "Company Brochure" of 10 pages for 1000 copies by duplex printing with a full-color cover with a laminated surface is 30 hours in the case of performing printing with a single printer (whose capability is at a constant level). Workable (operable) hours from the day of the printing partners B are calculated in consideration of elements such as their actual business days and business hours and holidays such as Saturdays and Sundays. Then, one of the printing partners B that is capable of reaching the standard term of work of printing determined for the details of the user order in the shortest period of time, that is, delivering prints based on the details of the user order in the shortest period of time, is selected as the printing partner.

For example, referring to FIG. 10, the actual business days of the printing partner B3 is Monday, Tuesday, Wednesday, and Friday (9-17). Further, it is assumed that the number of retained printers is five. The actual business days of the printing partner B4 is Monday, Tuesday, Wednesday, Thursday, and Friday (10-20). It is assumed that the number of retained printers is three. It is assumed that the time of receiving (accepting) a user order (the day) is Monday (early in the morning) and that the retained printers of all the printing partners B are available for the week on their projected operation schedule.

Here, it is assumed that the printing partners B put all of their retained printers into operation and perform printing using the entire hours of their actual business days. Since the standard term of work of printing (delivery time) per printer is 30 hours, the printing partner B3 completes the amount of work for 30 hours at 3 p.m. on Monday. That is, the printing partner B finishes printing of the prints and is ready to deliver the prints at 3 p.m. on Monday. Further, the printing partner B4 completes the amount of work for 30 hours at 8 p.m. on Monday. That is, the printing partner B finishes printing of the prints and is ready to deliver the prints at 8 p.m. on Monday. Accordingly, in this case, the printing partner B3, which is a partner capable of reaching the standard term of work of printing determined for the details of the user order earliest, that is, delivering prints based on the details of the user order in the shortest period of time, may be selected as the single printing partner.

At this point, it may be considered that the period of the printing process alone is reduced. However, it is clear that this contributes to reduction in the overall period of the processes of designing, printing, and shipping. Further, selecting a printing partner based only on a short delivery time does not necessarily mean discarding the quality of printing. This is because as long as the printing partners B are registered as printing partners, all the printing partners B are capable of performing printing of prints with quality at a certain level or higher.

On the other hand, in the case of a usual delivery time, in step S29, the printing partner selecting part 130 identifies (determines) the ordered printing fields from the details of the user order. For example, in this case, printing of "Company Brochure," Duplex Printing, Number of pages: 10, and Full-color cover with a laminated surface is ordered. Therefore, referring to the printing field table (FIG. 11), this printing order corresponds to Printing (four-color printing), Book-binding (Deluxe Edition), and Laminate (Mat). Therefore, the ordered printing fields are No. 12, No. 18, and No. 22.

In step S30, the printing partner selecting part 130 extracts one or more printing partners B that excels at the ordered printing fields in order to extract one or more printing partners B capable of providing the user-ordered prints with high quality. For example, referring to the printing partner recorded information (FIG. 10), a printing partner B for which No. 12, No. 18, and No. 22 are registered (recorded) in "Specialty Field" is extracted. Here, the printing partner B3, the printing partner B4, and the printing partner B7 have these printing fields registered as specialty fields. Here, in principle, a printing partner B whose specialty field corresponds to the ordered printing field is extracted. However, if there is no printing partner B whose specialty field corresponds to the ordered printing field, as the next option, a printing partner B whose handleable field corresponds to the ordered printing field is extracted.

Next, in step S31, the printing partner selecting part 130 obtains information on "User Evaluation," "Staff Technical Capability," "Reliability" (on a retained printer basis), and "Print Quality" (on a retained printer basis) of the printing partners B that have been extracted. The printing partner B3, the printing partner B4, and the printing partner B7 have been extracted so far as printing partners that have the user-ordered printing fields registered as their specialty fields. Therefore, the printing partner selecting part 130 obtains "User Evaluation," "Staff Technical Capability," "Reliability" (on a retained printer basis), and "Print Quality" (on a retained printer basis) of these printing partners B3, B4, and B7 registered with (recorded in) the printing partner DB 162.

Next, in step S32, the printing partner selecting part 130 provides scores based on the degree of evaluation of "User Evaluation." As described above, "User Evaluation" is the degree of evaluation (for example, A, B, C, etc.) of the printing partner B that has been made so far with respect to the finishing and quality of prints based on the feedback (for example, through word of mouth, etc.) from the user or based on an evaluation by the user. Therefore, a printing partner B with a high degree of evaluation is provided with a high score.

Next, in step S33, the printing partner selecting part 130 provides score based on the degree of evaluation of "Staff Technical Capability." As described above, "Staff Technical Capability" is the degree of evaluation (for example, A, B, C, etc.) of staff (technicians) belonging to the printing partner B with respect to the technical capability of printing. Therefore, a printing partner B with a high degree of evaluation is provided with a high score.

Next, in step S34, the printing partner selecting part 130 provides scores based on the degree of evaluation of "Reliability." As described above, "Reliability" is the degree of evaluation (for example, A, B, C, etc.) as to whether a printer is normally operable without failures. Therefore, a printing partner B with a high degree of evaluation is provided with a high score. The degree of evaluation of "Reliability" is provided on a retained printer basis. Therefore, the printing partner selecting part 130 calculates the average of the degrees of evaluation of "Reliability" of the retained printers on a printing partner basis, and determines the calculated average as the degree of evaluation of "Reliability" of the retained printers of the printing partner B. Then, the printing partner determining part 130 provides a score for the degree of evaluation.

Next, in step S35, the printing partner selecting part 130 provides scores based on the degree of evaluation of "Print Quality." As described above, "Print Quality" is the degree of evaluation (for example, A, B, C, etc.) as to whether a printer is capable of performing high-quality printing without contaminations such as stains due to transferred ink at a printing time. Therefore, a printing partner B with a high degree of evaluation is provided with a high score. The degree of evaluation of "Print Quality" is provided on a retained printer basis. Therefore, the printing partner selecting part 130 calculates the average of the degrees of evaluation of "Print Quality" of the retained printers on a printing partner basis, and determines the calculated average as the degree of evaluation of "Print Quality" of the retained printers of the printing partner B. Then, the printing partner determining part 130 provides a score for the degree of evaluation.

In step S36, based on the above, the printing partner selecting part 130 eventually selects one of the printing partners B which one has the highest score. Here, it is assumed that of the printing partner B3, the printing partner B4, and the printing partner B7, the printing partner B4 has the highest score and accordingly is selected as the printing partner.

The user accesses the Web site (FIG. 1) of the Web server 2 and places an order for prints. In the case of a member user, a printing partner B to which the user has previously placed an order (in the past) may be specified based on the past order history. In this case, the printing partner selecting part 130 re-selects the same printing partner B based on the order history, the request history, etc. Therefore, it is possible to maintain the same print quality as in the past for the member user.

Further, the printing partner selecting part 130 determines the delivery time of the printing process (a period up to completion of printing of prints) in each of the case of a usual delivery time and the case of a short delivery time as follows. First, in the case where the user order requests a usual delivery time, a predetermined period agreed upon beforehand with each printing partner B in accordance with the details of a printing order and accompanying printing work is determined as the delivery time of the printing process (for example, five days in the case of "Company Brochure," Duplex Printing, Number of pages: 10, Full-color cover with a laminated surface, and Number of copies: 1000).

On the other hand, in the case of a short delivery time, the delivery time of the printing process is flexibly changed. For example, in the above-described case, the fastest printing partner B3 finishes printing of prints and is ready to deliver the prints at 3 p.m. on Monday, and is therefore selected as the printing partner. In this case, the delivery time of the printing process may be determined to be one day. Further, in the case of taking an optional extra day into consideration, the delivery time of the printing process may be determined to be two days by adding an extra day (reserved) to the original one day. However, as described above, it is desired to determine the delivery time on an actual business day basis. That is, if the delivery time extends over a Saturday, a Sunday, etc., the date of completion of printing is determined taking a Saturday, a Sunday, etc., into consideration.

In the above-described embodiment, in the case of a usual delivery time (in the case where the delivery time is not short), a printing partner B is selected in light of quality, but is not selected in light of a short delivery time. This is because since the delivery time is not short, it is not necessarily required to check an available printing partner B or the volume of retained inventories of a printing partner B at this point. That is, in the case of a usual delivery time, a printing partner B is selected in terms of quality. The printing partner B may have no vacancy in the schedule or no available inventories at this time. This is because a delivery is to be made within the delivery time of the printing process agreed upon beforehand with each printing partner B.

[(d) Distribution Partner Selecting Step]

A description is given, with reference to FIG. 16 through FIG. 18, of a configuration of the distribution partner DB 163. The distribution partner DB 163 includes information items and tables shown below. FIG. 16 illustrates distribution partner recorded information. FIG. 17 illustrates a shipping field table. FIG. 18 illustrates information on the delivery vehicle schedule of a certain month of a distribution partner.

In the distribution partner recorded information of FIG. 16, information such as "Location," "Handleable Shipping Field," "Shipping Breakage Rate," "Wrong Shipping Rate," and "Shipping Delay Rate" is pre-recorded on an affiliated distribution partner basis. It is assumed that all the distribution partners C offer 24-hour services and no item is therefore provided in particular for "Business Day."

The item of "Location" indicates the location of the distribution partner C. Here, the location is where a delivery vehicle base is located from which delivery vehicles may be dispatched. For example, a large-scale nationwide distribution partner has a delivery vehicle base in each of major cities.

The item of "Handleable Shipping Field" indicates a distribution field that may be handled by the distribution partner C. In the shipping field table of FIG. 17, which illustrates a list of distribution (shipping) fields, the number (No.) of a shipping field handleable by the distribution partner C is stored in "Handleable Shipping Field." For example, the handleable shipping fields of the distribution partner C4 are 3 (mid-size car, regular service), 4 (mid-size car, dedicated service), 5 (compact car, regular service), and 6 (compact car, dedicated service), which illustrates that the distribution partner C4 provides delivery services using mid-size and compact cars as its own vehicles.

The item of "Shipping Breakage Rate," which is calculated from the past shipping (delivery) record of the distribution partner C, is the ratio of broken delivery items. The reasons for breakage of delivery items may vary from accidents to rough driving to poor stacking (poor handling of delivery items), for example. The shipping (delivery) breakage rate is calculated based on the number of cases where the breakage of a delivery item is confirmed at a delivery destination. A lower rate (value) indicates fewer broken or damaged delivery items, and a higher rate (value) indicates more broken or damaged delivery items.

The item of "Wrong Shipping Rate," which is calculated from the past shipping record of the distribution partner C, is the ratio of delivery items erroneously delivered to a wrong destination. The reasons for wrong shipping of delivery items may vary from misrecognition of a delivery destination to wrong addressing to mistaking of a delivery slip, for example. The wrong shipping (delivery) rate is calculated based on the number of cases where the wrong shipping of a delivery item is confirmed at a delivery destination. A lower rate (value) indicates fewer wrong shipments, and a higher rate (value) indicates more wrong shipments. If a delivery item is shipped (delivered) to a wrong destination, it is necessary to re-ship the delivery item: this time to a correct destination. Therefore, wrong shipments are a great cause of delivery delay.

The item of "Shipping Delay Rate," which is calculated from the past shipping record of the distribution partner C, is the ratio of delivery items delivered with delay relative to a delivery date. The reasons for late delivery (shipping) vary from misjudgment of a delivery route (selection of an inefficient route such as a route with many traffic lights) to traffic conditions (such as a traffic jam and a road blockage) to poor arrangements in shipping preparations, for example. The shipping (delivery) delay rate is calculated from the number of cases where a delivery delay is confirmed at a delivery destination. A lower rate (value) indicates less delivery delay, and a higher rate (value) indicates more delivery delay.

The categories of shipping fields are pre-recorded in the shipping field table of FIG. 17. The shipping field table is used to identify the handleable shipping field of the distribution partner C. The shipping fields are not limited to those described in FIG. 17, and may include other various shipping fields. Here, the regular service refers to a route delivery service that is provided at a fixed date and time. The dedicated service refers to an immediate and direct delivery (shipping) to a delivery destination in response to a user's delivery (shipping) order.

The information on the delivery vehicle schedule of a certain month of a distribution partner of FIG. 18 is the projected delivery schedule information of the vehicles retained by a distribution partner C. For example, FIG. 18 is the schedule table of April, 2011 of all the vehicles retained by a distribution partner C, illustrating the availability of each retained vehicle in the projected delivery schedule. The number next to a vehicle type indicates the number of available vehicles for the vehicle type. If the number of available vehicles is zero, this indicates that there is no available vehicle for the vehicle type and the delivery schedule of all the vehicles is fixed. In the case of making a request for distribution to the distribution partner C, a distribution partner C is selected that has a vacancy in the schedule of its retained vehicles (that is, an available vehicle) to be able to respond to the request. The projected delivery schedule information of the retained vehicles is recorded on a distribution partner basis in the distribution partner DB 163, and it is assumed that the projected delivery schedule information of the retained vehicles is updated on a daily basis based on reports from the distribution partners C. Further, if the distribution partner C is able to make arrangements for vehicles of an affiliated partner, for example, the distribution partner C may include these vehicles in the report although they are not its own vehicles. This is because it is only necessary that the distribution partner C has a vehicle available for delivery at the point. Further, in the case of FIG. 18, the schedule is illustrated day by day. However, the schedule may also be illustrated with calendar days broken down into hours.

[Distribution Partner Selecting Process]

FIG. 19 is a flowchart illustrating a distribution partner selecting process according to this embodiment. As described above, in response to receiving an order for shipping from the user, the distribution partner selecting part 140 selects a distribution partner C that best matches up to the user order from among the multiple distribution partners C registered with the distribution partner DB 163 in light of quality and a short delivery time in particular. A detailed description is given below with reference to the drawings.

In step S41, the distribution partner selecting part 140 obtains the details of a user order from the input part 110. Here, of the above-described details of the user order, "Company Brochure" (for identifying the details of a delivery item), Usual Delivery Time, Duplex Printing, Number of pages: 10, Full-color cover with a laminated surface, Number of copies: 1000 (for identifying the volume of delivery of the delivery item), and Delivery Destination: 800 copies to the Sendai branch and 200 copies to the Tokyo headquarter are obtained as shipping-related (delivery-related) information.

Next, in step S42, the distribution partner selecting part 140 obtains (determines) the printing partner B (location) from which prints are to be collected. This printing partner B has been selected by the printing partner selecting process and has performed printing of the prints. In order to deliver the prints to a delivery destination, it is necessary to first collect (pick up) the prints. It is assumed that in this case, the collecting destination from which the prints are collected is the printing partner B (Tokyo . . . ).

Next, in step S43, the distribution partner selecting part 140 determines the volume of delivery from the details of the user order, and identifies a handleable shipping field corresponding to the volume of delivery. The distribution partner selecting part 140 estimates the volume of delivery from the information on prints obtained in step S41 ("Company Brochure," Duplex Printing, Number of pages: 10, Full-color cover with a laminated surface, and Delivery Destination: 800 copies to the Sendai branch and 200 copies to the Tokyo headquarter). For example, the distribution partner selecting part 140 estimates the volume of delivery to the Tokyo headquarter and the volume of deliver to the Sendai branch to be two packages of prints and eight packages of prints, respectively. Further, the distribution partner selecting part 140 determines that each volume may be delivered in a compact car and that the handleable shipping field is a compact car (No. 5 and No. 6 in FIG. 17). Physically, the volume deliverable in a compact car is also deliverable in a large-size or mid-size car. However, a delivery is quicker with a smaller vehicle. Therefore, a vehicle is selected that is capable of delivery and as small in size as possible. This also reduces cost.

In step S44, the distribution partner selecting part 140 extracts one or more distribution partners C that have the shipping field registered as their handleable shipping fields and are in the same area as the printing partner B (location). For example, since the prints are to be collected from the printing partner B (Tokyo . . . ), the distribution partner selecting part 140 extracts distribution partners C in the same area (for example, the same prefecture, city, region, etc.) as the printing partner B, referring to the distribution partner recorded information (FIG. 16). Here, the distribution partner selecting part 140 selects the distribution partner C3, the distribution partner C4, and the distribution partner C5, which are in the same area, that is, Tokyo prefecture, as the printing partner B. Further, of these, the distribution partner C3 and the distribution partner C4, which have No. 5 and No. 6 registered as their handleable shipping fields, are extracted since the handleable shipping field is a compact car. If there is no distribution partner C that retains a compact car, a distribution partner C that retains a large-size or mid-size car may alternatively be extracted because a delivery may also be made with a large-size or mid-size car as described above.

In step S45, it is determined whether the delivery time is short. That is, if the details of the user order include (request) a short deliver time (an urgent delivery) (YES in step S45), the process proceeds to step S46. If the details of the user order does not include a short delivery time, that is, the delivery time is usual (NO in step S45), the process proceeds to step S53.

In the case of a short delivery time (an urgent delivery), in step S46, as information for estimating the shipping (delivery) capability of the distribution partner C at this point, the distribution partner selecting part 140 obtains the immediate schedule of the retained vehicles whose vehicle type has been specified in the handleable shipping field of the extracted distribution partner C. For example, the distribution partner selecting part 140 obtains the projected delivery schedule (FIG. 18) of the compact cars (dedicated service) of each of the distribution partner C3 and the distribution partner C4, and extracts the distribution partner C3 or the distribution partner C4 that has a vacancy in the schedule. This is because a distribution partner C that has no available delivery vehicle is incapable of delivering the prints. In the case of a short delivery time, a compact car (dedicated service) that provides a quick delivery is used, and in the case where the delivery time is not short, a compact car (regular service) is used. Further, the projected delivery schedule (FIG. 18) is caused to correspond to the delivery deadline of the printing process, and the projected delivery schedule of a compact car (dedicated service) at the date of completion of printing is obtained.

If the distribution partner C is uniquely determined in step S47, that is, a single distribution partner C is extracted at this step, the extracted distribution partner C may be selected (in step S52). If there is only one distribution partner C that has an available vehicle, it is desirable to select the distribution partner C in terms of a short delivery time without considering a subsequent process.

In step S48, as information for estimating the shipping capability of the distribution partner C at this point, the distribution partner selecting part 140 calculates a distance from the distribution partner base to the collecting destination to the delivery destination. The distribution partner C departs from the distribution partner base, and collects the prints from the printing partner B that has performed printing of the prints. Thereafter, the distribution partner C moves to the delivery destination. Therefore, the distribution partner C whose total of the distance between the distribution partner C and the collecting destination and the distance between the collecting destination and the delivery destination is the shortest is capable of making a delivery to the delivery destination in the shortest time. Since the distance between the collecting destination and the delivery destination remains the same for any distribution partner C, it may be considered that the distribution partner C whose distance between the distribution partner base and the collecting destination is the shortest is capable of making a delivery to the delivery destination in the shortest time.

If it is determined in step S49 that there is a difference of more than or equal to a predetermined distance (value) between the respective distances between the distribution partner base and the collecting destination of the distribution partners C that has been extracted, in step S52, one of the distribution partners C whose distance between the distribution partner base and the collecting destination is the shorter or shortest is selected. That is, if there is a difference of more than or equal to a predetermined distance (for example, 5 km) between the distribution partners C in the distance between the distribution partner base and the collecting destination, one of the distribution partners C which one is at the shortest distance from the collecting destination is selected. As a result, the distribution partner C is selected that is located closer to the collecting destination than any other distribution partners C. On the other hand, if the distance difference is less than the predetermined distance, that is, if there is hardly distance difference, the process proceeds to step S50.

In step S50, as information for estimating the shipping capability of the distribution partner C at this point, the distribution partner selecting part 140 obtains the values of "Wrong Shipping Rate" and "Shipping Delay Rate" (FIG. 16) of the distribution partners C that have been extracted. As described above, "Wrong Shipping Rate" is calculated from the past shipping record of the distribution partner C, and is the ratio of delivery items erroneously delivered to a wrong destination. Further, "Shipping Delay Rate" is calculated from the past shipping record of the distribution partner C, and is the ratio of delivery items delivered with delay relative to a delivery date. If these values are smaller, there are fewer wrong shipments and delayed deliveries. Therefore, the distribution partner C whose values of these rates are small contributes to a short-time delivery.

In step S51, the distribution partner selecting part 140 selects one distribution partner C whose values of "Wrong Shipping Rate" and "Shipping Delay Rate" are the smallest among the distribution partners C that have been extracted. If the values of "Wrong Shipping Rate" and "Shipping Delay Rate" are smaller, there are fewer wrong shipments and delayed deliveries. Therefore, the distribution partner C whose values of these rates are small contributes to a short-time delivery.

On the other hand, in the case of a usual delivery time, in step S53, the distribution partner selecting part 140 obtains the values of "Shipping Breakage Rate" (FIG. 16) of the distribution partners C that have been extracted. As described above, "Shipping Breakage Rate" is calculated from the past shipping (delivery) record of the distribution partner C, and is the ratio of broken delivery items. If this value is smaller, there are fewer broken or damaged delivery items. Therefore, the distribution partner C whose value of this rate is small contributes to a short-time delivery.

In step S54, the distribution partner selecting part 140 selects one of the distribution partners C whose value of "Shipping Breakage Rate" is the smallest. Here, of the distribution partner C3 and the distribution partner C4, the distribution partner C4 has the smaller value of "Shipping Breakage Rate." Accordingly, the distribution partner C4 is selected as the distribution partner.

The distribution partner selecting part 140 determines the delivery time of the shipping process (a period up to completion of shipping [delivery] of prints) in each of the case of a usual delivery time and the case of a short delivery time as follows. In the case of a short delivery time, a vehicle of a dedicated service is dispatched. Therefore, the collection of a delivery item is immediately started at the date and time specified by the request. On the other hand, the case of a usual delivery time is different in that a vehicle of a regular service is dispatched so that the collection of a delivery time is suitably started (upon completion of preparations). For example, the period (the number of days) presented in advance by each distribution partner C in accordance with the location of a delivery destination is determined as the delivery time of the shipping process. For example, a predetermined shipping (delivery) period such as up to two days for a large-size, mid-size, and compact car (regular service), up to one day for a large-size, mid-size, and compact car (dedicated service), or up to 0.5 days for a motorbike (dedicated service) for shipping from Tokyo to Sendai may be determined as the delivery time.

Further, the term "shipping capability" used in the above description is not a capability indicating a volume of delivery, such as an ability to deliver a large volume of delivery items at a time, but is used to mean a capability indicating delivery speed, such as an ability to swiftly deliver a delivery item.

[(e) Partner Requesting Step]

A description is given above of (a) the user order inputting step, (b) the design partner selecting step, (c) the printing partner selecting step, and (d) the distribution partner selecting step. At this point, the partner selecting server 1 has selected one of the design partners A, one of the printing partners B, and one of the distribution partners C for the processes of designing, printing, and shipping, respectively. Accordingly, in this partner requesting step, the order placing part 150 of the partner selecting server 1 makes requests for the processes of designing, printing, and shipping to the selected design partner A, printing partner B, and distribution partner C, respectively.

[Case of Usual Delivery Time]

As described above, the user may choose between a usual delivery time and a short delivery time at the time of placing an order. First, in the case of a usual delivery time, the partner selecting server 1 has selected one of the design partners A, one of the printing partners B, and one of the distribution partners C for the processes of designing, printing, and shipping, respectively, through the above-described steps. Therefore, the partner selecting server 1 places orders for the services of designing, printing, and shipping (delivery) to the selected design partner A, printing partner B, and distribution partner C, respectively. As described above, the partner selecting server 1 of the cloud printing system 100 is connected to the design partners A, the printing partners B, and the distribution partners C via an electric network, and the design partners A, the printing partners B, and the distribution partners C have respective PC terminals (not graphically illustrated) in order to receive requests from the partner selecting server 1. Therefore, the partner selecting server 1 may place orders for services to the respective PC terminals via the network.

Further, in placing orders for services, the partner selecting server 1 notifies the individual selected partners of the details of the user order. For example, to the design partner A, the partner selecting server 1 transmits information such as "Company Brochure," Usual Delivery Time, Use of a design service, and Design Requests (a design outline, text information, a requested image drawing, other requests, etc.) as information necessary for designing, that is, design-related information in the details of the user order. Further, to the printing partner B, the partner selecting server 1 transmits information such as "Company Brochure," Usual Delivery Time, Duplex Printing, Number of pages: 10, Full-color cover with a laminated surface, and Number of copies: 1000 as information necessary for printing, that is, printing-related information in the details of the user order. Further, to the distribution partner C, the partner selecting server 1 transmits information such as "Company Brochure" (for identifying the details of a delivery item), the volume of delivery of delivery items (calculable from prints), and a delivery destination as information necessary for shipping (delivery), that is, shipping-related (delivery-related) information in the details of the user order.

Further, in placing orders for services, the partner selecting server 1 notifies each selected partner of a work schedule, that is, a date and time at which it becomes possible for the partner to start on the ordered service. In the process up to completion of the delivery of prints, first, the design partner A creates a complete original, and the printing partner B prints the complete original. Then, the distribution partner C delivers prints. Therefore, the printing partner B is notified of a date and time at which the complete original is ready and available for printing, and the distribution partner C is notified of a date and time at which prints are ready and available for delivery.

In the case of a usual delivery time, the delivery time may be calculated based on a predetermined period that is agreed upon as described above. If the user order requests a usual delivery time, in the design process, a predetermined period agreed upon in advance with each design partner A in accordance with the details of a design order and accompanying design work is determined as the delivery time of the design process (for example, 10 days for a company brochure). Further, in the printing process, a predetermined period agreed upon in advance with each printing partner B in accordance with the details of a printing order and accompanying printing work is determined as the delivery time of the printing process (for example, five days in the case of "Company Brochure," Duplex Printing, Number of pages: 10, Full-color cover with a laminated surface, and Number of copies: 1000).

Further, in the shipping process, a period (the number of days) presented by each distribution partner C in accordance with the location of a delivery destination is the delivery time of the shipping process (for example, two days in the case of a large-size, mid-size, and compact car [regular service] for a delivery from Tokyo to Sendai).

Accordingly, in placing orders for services, the partner selecting server 1 may calculate a date and time at which it becomes possible for each partner to start on the ordered service from the corresponding delivery time. Therefore, the partner selecting server 1 notifies each partner of the calculated date and time at which it becomes possible for the partner to start on the ordered service. For example, it is assumed that no consideration is given to holidays and the user order is placed on April 1. The user order is immediately accepted and a delivery deadline of April 11 (from April 1 to April 11) is determined for the design partner A. Then, it is possible for the printing partner B to start on the ordered service on, for example, April 12, and a deadline of April 16 (from April 12 to April 16) is determined. Further, it is possible for the distribution partner C to make a delivery on, for example, April 17, and a deadline of April 18 (from April 17 to April 18) is determined. That is, the shipping (delivery) to a delivery destination is completed on April 18.

As described above, when the user places an order for prints on the Web site (FIG. 1), a delivery time (deadline) (and an estimated price) is caused to be displayed. In terms of user convenience as well, it is desired to clearly display a delivery time (and an estimated price) as much as possible. Therefore, in addition to selecting a partner in each process, the partner selecting server 1 calculates a delivery time in each of the processes of designing, printing, and shipping, calculates an overall delivery time by totaling the delivery times of the individual processes, and causes the Web server 2 to display the calculated overall delivery time. For example, in the above-described case, the Web server 2 displays the overall delivery time of the design process (from April 1 to April 11), the printing process (from April 12 to April 16), and the shipping process (from April 17 to April 18). Further, the Web server 2 also displays information indicating that shipping (delivery) to a delivery destination is completed on April 18 (FIG. 20). After confirming these delivery times on the Web site, the user finalizes the order. Then, the order is determined (completed), and the user order is formally accepted on the system.

[Case of Short Delivery Time]

In the case of a short delivery time as well, the partner selecting server 1 has selected one of the design partners A, one of the printing partners B, and one of the distribution partners C for the processes of designing, printing, and shipping, respectively, through the above-described steps. Therefore, the partner selecting server 1 places orders for the services of designing, printing, and shipping (delivery) to the selected design partner A, printing partner B, and distribution partner C, respectively. Further, the same as in the case of a usual delivery time, the partner selecting server 1 notifies the individual selected partners of the details of the user order in placing orders for services.

Further, in the case of a short delivery time as well, the partner selecting server 1 notifies each selected partner of a work schedule, that is, a date and time at which it becomes possible for the partner to start on the ordered service. However, unlike in the case of a usual delivery time, in the case of a short delivery time, the delivery time is flexibly determined as described above. For example, in the above-described case, in the case of a short delivery time, the delivery time of the selected design partner A is 7.5 days. Further, the delivery time of the selected printing partner B is one day. Further, the delivery time of the selected distribution partner C is one day.

Accordingly, in placing orders for services, the partner selecting server 1 may calculate a date and time at which it becomes possible for each partner to start on the ordered service from the corresponding delivery time thus flexibly determined. Therefore, the partner selecting server 1 notifies each partner of the calculated date and time at which it becomes possible for the partner to start on the ordered service. For example, it is assumed that no consideration is given to holidays and the user order is placed on April 1. The user order is immediately accepted and a delivery deadline of April 9 (from April 2 to April 9) is determined for the design partner A. Then, it is possible for the printing partner B to start on the ordered service on, for example, April 10, and a deadline of April 11 (from April 10 to April 11) is determined. Further, it is possible for the distribution partner C to make a delivery on, for example, April 12, and a deadline of April 13 (from April 12 to April 13) is determined. That is, the shipping (delivery) to a delivery destination is completed on April 13.

In the case of a short delivery time as well, when the user places an order for prints on the Web site (FIG. 1), the partner selecting server 1 calculates a delivery time in each of the processes of designing, printing, and shipping, calculates an overall delivery time by totaling the delivery times of the individual processes, and causes the Web server 2 to display the calculated overall delivery time (FIG. 21). After confirming these delivery times on the Web site, the user finalizes the order. Then, the order is determined (completed), and the user order is formally accepted on the system.

In recent years, it has been considered important for corporate activities to be environmentally friendly because of an increasing trend toward environmental protection or energy saving. Further, from a consumers' viewpoint as well, environmentally-friendly products and services have been favored, so that being environmentally friendly has even become one of criteria in determining which product or service to choose.

As described in the above embodiment, the cloud printing system 100 that makes it possible to place an order for prints (printed materials) via the Web site (FIG. 1) selects a partner for each of the processes of designing, printing, and shipping (delivery). On the system, if consideration is given to an environment, it is desirable in selecting each partner to take into consideration, in addition to a delivery time and quality, whether as much consideration as possible is given to an environment. That is, in (b) the design partner selecting step, it is preferable for the above-described selecting method to select a design partner A capable of performing as environmentally friendly design activities as possible. Further, in (c) the printing partner selecting step, it is preferable for the above-described selecting method to select a printing partner B capable of performing as environmentally friendly printing activities as possible. Further, in (d) the distribution partner selecting step, it is preferable for the above-described selecting method to select a distribution partner C capable of performing as environmentally friendly shipping (delivery) activities as possible.

For example, it is often the case with the design partners A that their offices are modern in design. In selecting the design partner, the partner selecting server 1 gives preference to a design partner A whose office design is environmentally friendly in particular among the design partners A. This is because, for example, if an office environment is so created as to let in natural light as much as possible, the office is reduced in electric power for lighting. Further, since a complete original is subsequently printed by the printing partner B, it is desirable for the complete original to be so designed in the design process as to be printable with as little toner and ink in amount as possible. That is, with respect to the design partner (designer), the partner selecting server 1 selects a design partner A capable of providing as environmentally-friendly a design as possible in consideration of the printing process as well.

Further, in selecting the printing partner, the partner selecting server 1 gives preference to printing partners A such as a printing partner A that retains printers of low power consumption, a printing partner A that uses recycled paper for printing paper and recycled toner as much as possible, and a printing partner A that makes an effort to save energy in lighting, etc., as a printing factory as a whole. This is because any of these elements reduces environmental impact.

Further, in selecting the distribution partner, the partner selecting server 1 gives preference to distribution partners C such as a distribution partner C that retains delivery vehicles of low $CO_2$ emission and a distribution partner C that gives instructions recommending driving with a low environmental load. This is because either element reduces environmental impact.

In the case of selecting a partner that gives consideration to an environmental load, the partner selecting server 1 may have the degree of environmental evaluation of each partner stored in advance in a database (DB) (in the storage part 160 of FIG. 4, for example) in light of the above-described individual elements, and give preference to a partner whose degree of environmental evaluation is high in the selecting. In the above-described embodiment, partners are selected focusing on the aspect of a short delivery time or quality. If the partners are not narrowed down to one by the selecting that focuses on the aspect of a short delivery time or quality, a partner whose degree of environmental evaluation is the highest may be given preference and selected from among the partners.

According to the above-described embodiment, it is possible to provide a cloud printing system that automatically selects, in terms of quality in particular, an optimum affiliated business operator (partner) from among multiple affiliated business operators in each of processes up to completion of the delivery of prints, such as designing, printing, and shipping (delivery) processes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

Further, elements, expressions, and any combinations thereof may be applied to methods, apparatuses, systems, computer programs, recording (storage) media, etc., which are effective as embodiments of the present invention.

According to an aspect of the present invention, it is possible to provide a cloud printing system and a partner selection method that automatically select (determine), in light of quality in particular, an optimum affiliated business operator in each of individual processes up to completion of the delivery of prints, such as designing, printing, and shipping processes.

What is claimed is:
1. A printing system for ordering services of processes up to completion of a delivery of a print via an electrical network in response to an order for the print from a user, the printing system comprising:
   a first storage part storing a plurality of printing partners providing respective printing services, predetermined printing fields in the printing services provided by the printing partners, and printing quality evaluation degrees indicating printing quality of the printing services provided by the printing partners, the printing partners being correlated with the respective predetermined printing fields and the respective printing quality evaluation degrees;
   a second storage part storing a plurality of distribution partners providing respective delivery services, and delivery quality evaluation degrees indicating quality of the delivery services provided by the distribution partners, the distribution partners being correlated with the respective delivery quality evaluation degrees;
   a printing partner selecting part configured to select, from among the printing partners by referring to the first storage part, a single printing partner whose predetermined printing field matches a printing field to which the print ordered by the user corresponds and whose printing evaluation degree is the highest among the printing partners;

a distribution partner selecting part configured to select, from among the distribution partners by referring to the second storage part, a single distribution partner whose delivery quality evaluation degree is the highest among the distribution partners;

an order placing part configured to place, via the electrical network, an order for the printing service for printing the print to the single printing partner and an order for the delivery service for delivering the print to the single distribution partner;

a third storage part storing a plurality of design partners providing respective original print creating services, specialty design fields of the design partners, images of original prints previously delivered by the design partners, and design quality evaluation degrees indicating design quality of the design partners, the design partners being correlated with the respective specialty design fields, the respective images of the original prints, and the respective design quality evaluation degrees;

an image comparing and analyzing part configured to compare and analyze the images of the original prints and corresponding requested images ordered by the user, and to provide a first score to the design partners in accordance with a color and shape similarity of the respective previously delivered original prints to the corresponding user-requested images;

a clearness analyzing part configured to calculate brightness and contrast degrees from the images of the original prints, and to provide a second score to the design partners in accordance with the brightness and contrast degrees of the respective original prints; and a design partner selecting part configured to select, from among the design partners by referring to the third storage part, a single design partner whose specialty design field matches a design field to which the user-ordered print corresponds and whose total of the first score, the second score, and a third score provided in accordance with the design quality evaluation degree is the highest among the design partners, wherein the order placing part is configured to place an order for the original print creating service for the print to the single design partner via the electrical network.

2. A method of selecting partners to which services of processes up to completion of a delivery of a print are ordered via an electrical network in response to an order for the print from a user, the method comprising:

reading, from a first storage part, a plurality of printing partners providing respective printing services, predetermined printing fields in the printing services provided by the printing partners, and printing quality evaluation degrees indicating printing quality of the printing services provided by the printing partners;

reading, from a second storage part, a plurality of distribution partners providing respective delivery services, and delivery quality evaluation degrees indicating quality of the delivery services provided by the distribution partners;

selecting, from among the printing partners, a single printing partner whose predetermined printing field matches a printing field to which the print ordered by the user corresponds and whose printing evaluation degree is the highest among the printing partners;

selecting, from among the distribution partners, a single distribution partner whose delivery quality evaluation degree is the highest among the distribution partners;

placing, via the electrical network, an order for the printing service for printing the print to the single printing partner and an order for the delivery service for delivering the print to the single distribution partner;

reading, from a third storage part, a plurality of design partners providing respective original print creating services, specialty design fields of the design partners, images of original prints previously delivered by the design partners, and design quality evaluation degrees indicating design quality of the design partners;

comparing and analyzing the images of the original prints and corresponding requested images ordered by the user, and providing a first score to the design partners in accordance with a color and shape similarity of the respective previously delivered original prints to the corresponding user-requested images;

calculating brightness and contrast degrees from the images of the original prints, and providing a second score to the design partners in accordance with the brightness and contrast degrees of the respective original prints; and selecting, from among the design partners, a single design partner whose specialty design field matches a design field to which the user-ordered print corresponds and whose total of the first score, the second score, and a third score provided in accordance with the design quality evaluation degree is the highest among the design partners, wherein said placing places an order for the original print creating service for the print to the single design partner via the electrical network.

3. A non-transitory computer-readable storage medium storing a program for causing a computer to execute the method of selecting partners to which services of processes up to completion of a delivery of a print are ordered via an electrical network in response to an order for the print from a user as set forth in claim 2.

* * * * *